United States Patent
Hara et al.

(10) Patent No.: US 8,128,215 B2
(45) Date of Patent: Mar. 6, 2012

(54) INK JET PRINTER, INK JET RECORDING METHOD, AND RECORDED MATTER

(75) Inventors: Kazuhiko Hara, Nagano (JP);
Masanori Takemura, Nagano (JP);
Hiroshi Fukumoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 943 days.

(21) Appl. No.: 11/170,722

(22) Filed: Jun. 29, 2005

(65) Prior Publication Data

US 2006/0050118 A1    Mar. 9, 2006

(30) Foreign Application Priority Data

Jun. 30, 2004 (JP) .............................. P.2004-194476

(51) Int. Cl.
*B41J 2/01* (2006.01)

(52) U.S. Cl. ............... 347/95; 347/85; 347/84; 347/100

(58) Field of Classification Search .................. 347/100, 347/85, 86, 84, 88, 99, 95, 96, 101, 102; 106/31, 6, 31.27, 31.13, 31.6; 523/160, 161
See application file for complete search history.

(56) References Cited

U.S. PATENT DOCUMENTS 5,089,050 A * 2/1992 Vieira et al. ............... 106/31.43
(Continued)

FOREIGN PATENT DOCUMENTS

JP    11-240182    9/1999
(Continued)

OTHER PUBLICATIONS

English Abstract of Publication No. JP11-240182 Published Sep. 7, 1999.

(Continued)

*Primary Examiner* — Manish S Shah

(57) ABSTRACT

The present invention provides an ink jet printer having an ink-contacting member which is in contact with an ink until the ink is injected from a print head and which contains an antioxidant, wherein the ink-contacting member has a concentration of a compound represented by the following formula (1) of 100 ppm or less:

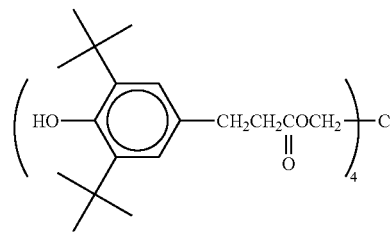

(1)

Further, an ink jet recording method using the ink jet printer and recorded matter recorded by the ink jet recording method are also disclosed. According to the invention, there is provided an ink jet printer using an ink-contacting member which inhibits the formation of a crystalline molecular complex.

14 Claims, 3 Drawing Sheets

U.S. PATENT DOCUMENTS

| | | | |
|---|---|---|---|
| 5,876,492 A * | 3/1999 | Malhotra et al. | 106/31.58 |
| 6,232,469 B1 * | 5/2001 | Seto et al. | 546/244 |
| 6,698,871 B1 | 3/2004 | Hayashi et al. | |
| 6,815,496 B2 * | 11/2004 | Tasaka et al. | 525/50 |
| 2002/0145651 A1 * | 10/2002 | Hayashi et al. | 347/86 |
| 2004/0044092 A1 * | 3/2004 | Noda | 521/155 |
| 2004/0044106 A1 | 3/2004 | Portnoy et al. | |
| 2004/0090064 A1 * | 5/2004 | Rowley | 285/256 |

FOREIGN PATENT DOCUMENTS

| | | |
|---|---|---|
| JP | 2004-514775 | 5/2004 |
| WO | 02/44260 A2 | 6/2002 |

OTHER PUBLICATIONS

English Abstract of Publication No. JP2004-514775 Published May 20, 2004.

* cited by examiner

INK JET PRINTER, INK JET RECORDING METHOD, AND RECORDED MATTER

FIELD OF THE INVENTION

The present invention relates to an ink jet printer which inhibits the precipitation of foreign matter in an ink passage and the like.

BACKGROUND OF THE INVENTION

Ink jet recording is a process of ejecting an ink composition as small droplets through minute nozzles to record letters and images (hereinafter also simply referred to as "images") on a surface of a recording medium. The ink jet recording processes that have come in practice include a process of converting an electric signal to a mechanical signal using an electrostrictive element, thereby intermittently ejecting an ink composition stored in a nozzle-head portion to record letters and images on a surface of a recording medium; a process of rapidly heating an ink composition stored in a nozzle head portion at a part very close to an ejection portion to generate bubbles, and intermittently ejecting the ink composition by volume expansion due to the bubbles to record letters and images on a surface of a recording medium; and the like.

Further, as an ink composition for ink jet recording, there is commonly used one in which various dyes are dissolved in water, an organic solvent or a mixed solution thereof, from the aspects of safety and print characteristics. In various characteristics, more strict conditions are required, compared to an ink composition for writing things such as a fountain pen and a ball pen.

One of the conditions includes that a clean and stable ink can be supplied so that the ink can stably flow in its passage, thereby not leading to printed image defects such as printing failure and thin spot even when the ink undergoes changes in temperature or changes with time.

However, when an elastomer resin containing a polyolefin resin is used in an ink-contacting member such as a confluence passage of the ink or a film for blocking it, it has become clear that a crystalline molecular complex is formed by the contact with the ink in some cases. This crystalline molecular complex is brittle and breaks down into an acicular form, so that it passes through a filter for trapping foreign matter to clog a minute passage of a nozzle head, which causes abnormal ejection.

SUMMARY OF THE INVENTION

It is therefore an object of the invention to provide an ink jet printer using an ink-contacting member which inhibits the formation of a crystalline molecular complex.

Another object of the invention is to provide an ink jet recording method using the above-mentioned ink jet printer.

A still another object of the invention is to provide recorded matter recorded by the above-mentioned ink jet recording method.

Other objects and effects of the present invention will become apparent from the following description.

The present inventors have conducted extensive studies in view of the above-mentioned objects. As a result, it has been discovered that when the amount of a specific antioxidant used, which is presumed to be concerned with the formation of the crystalline molecular complex, among components of the ink-contacting member is restricted, the above-mentioned problems can be solved. Based on this finding, the invention has been completed.

The invention provides an ink jet printer having an ink-contacting member which is in contact with an ink until the ink is injected from a print head and which contains an antioxidant, wherein the ink-contacting member has a concentration of a compound represented by the following formula (1) in 100 ppm or less;

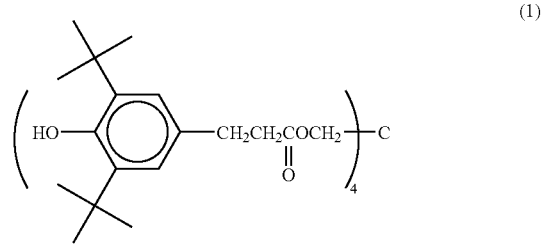

As the above-mentioned antioxidant, a compound represented by the following formula (2) and/or formula (3) is preferably contained:

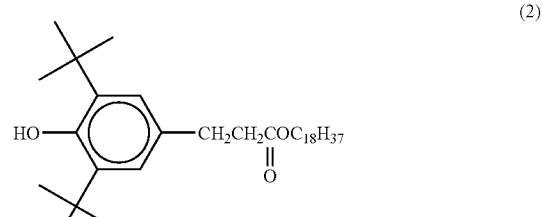

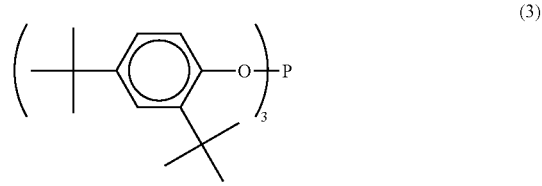

Further, the invention provides an ink jet recording method comprising ejecting droplets of an ink composition to attach the droplets onto a recording medium, thereby performing printing, wherein the above-mentioned ink jet printer is used as an ink jet printer.

Furthermore, the invention provides recorded matter recorded by the above-mentioned ink jet recording method.

Figure 1:
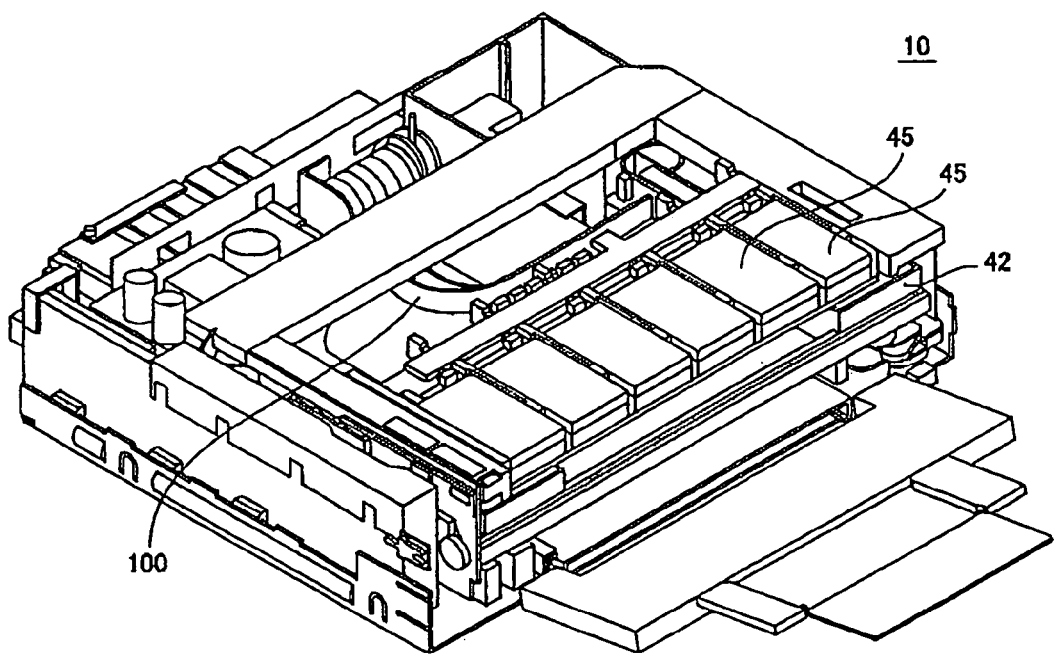
FIG. 1 is an illustration schematically showing an example of an ink jet printer of the invention.

The reference numerals used in the drawings denote the followings, respectively.

| | |
|---|---|
| 10: | Printer |
| 11: | Matter to be printed |
| 42: | Carriage |
| 44: | Recording head |
| 45: | Cartridges |
| 48: | Guide shafts |
| 100: | Liquid conductive material |
| 110: | Base material |
| 120: | Tabular long-sheet material |

DETAILED DESCRIPTION OF THE INVENTION

In the invention, the content of a compound of the following formula (1) (placed on the market as Irganox 1010 (registered trade mark)) in an ink-contacting member is adjusted to a definite value or less, thereby making stable printing possible without the occurrence of clogging in a print head and an ink feed section of a printer. The content of the compound of the following formula (1) in the ink-contacting member is measured by high performance liquid chromatography (HPLC) or the like after extraction with an appropriated solvent by Soxhlet extraction.

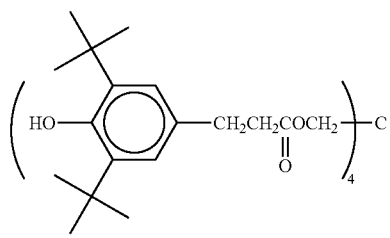

(1)

The ink-contacting member used in the printer of the invention corresponds to all that is in contact with an ink at least partly or entirely until the ink is ejected from the print head, including an ink storage container which is in contact with the ink from the start, and specific examples thereof include an ink tank for storing the ink (for example, an ink pack, an ordinary ink cartridge or a sub tank), a member for attaching the ink tank (for example, a needle-like member for attaching the ink pack or a needle-like member for attaching the ink cartridge), an ink fluid path joint such as a tube or an O-ring and the ink head.

Figure 2:
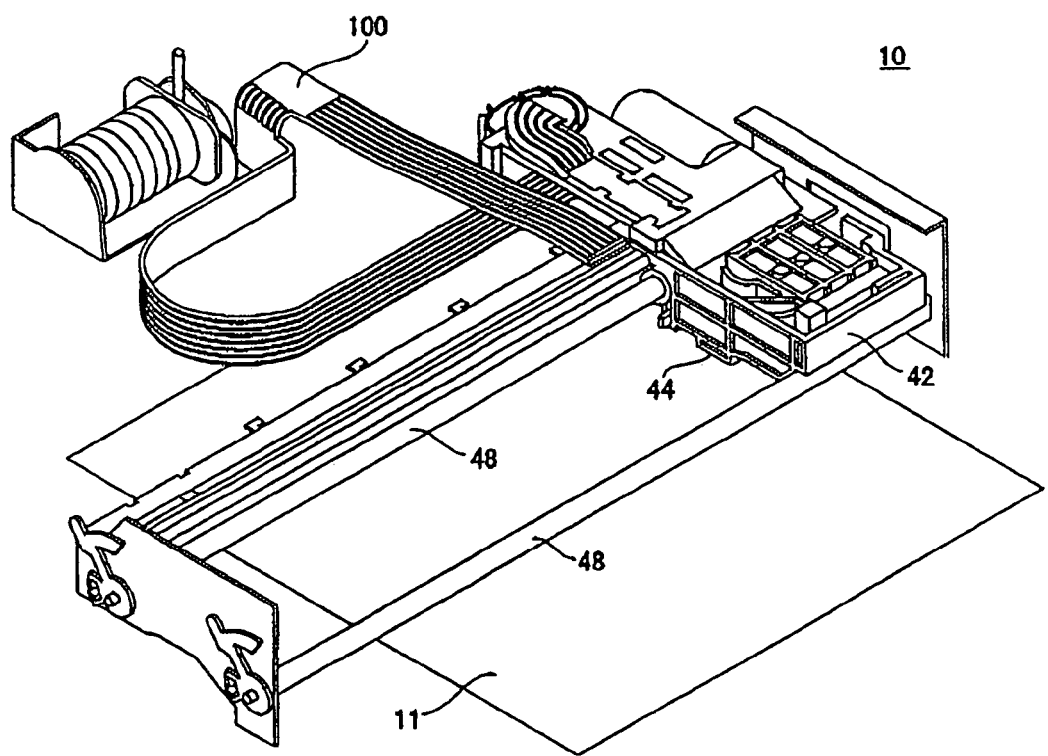
FIG. 2 is an illustration schematically showing a liquid conductive material.
Figure 3:
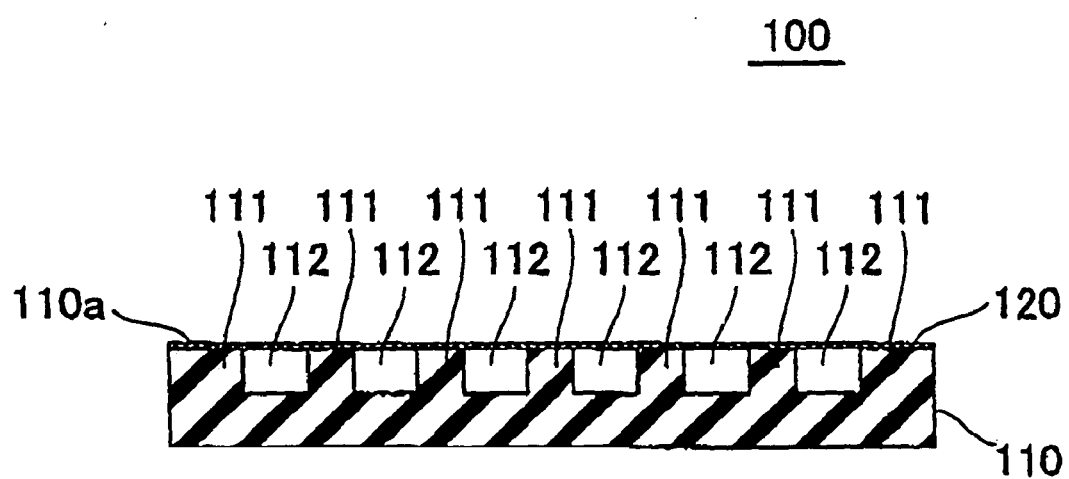
FIG. 3 is a cross sectional view showing a liquid conductive material.

FIG. 1 and FIG. 2 are perspective views indicating an example of a printer 10 of the invention. The ink-contacting member is, for example, a cartridge 45, a liquid conductive material 100 or the like. Reference numeral 42 denotes a carriage, reference numeral 44 denotes a recording head, reference numeral 48 denotes guide shafts, and reference numeral 11 denotes matter to be recorded. A cross sectional view of the liquid conductive material 100 is as shown in FIG. 3, and it comprises a base material 110 having ribs 111 and groove portions 112 and a tabular long-sheet material 120. Both the base material and the tabular long-sheet material are the ink-contacting member.

In the ink-contacting member, the content of the compound represented by formula (1) is 100 ppm or less, and more preferably 50 ppm or less, thereby inhibiting the formation of a crystalline molecular complex caused by contact with the ink solution. The compound represented by formula (1) is usually incorporated as an antioxidant. However, in place of this, a compound represented by the following formula (2) ((placed on the market as Irganox 1076 (registered trade mark)) and/or a compound represented by the following formula (3) ((placed on the market as Irgafos 168 (registered trade mark)) are preferably used.

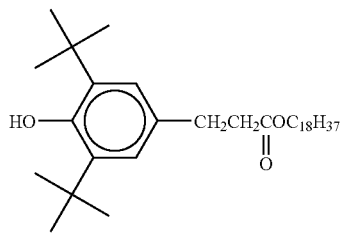

(2)

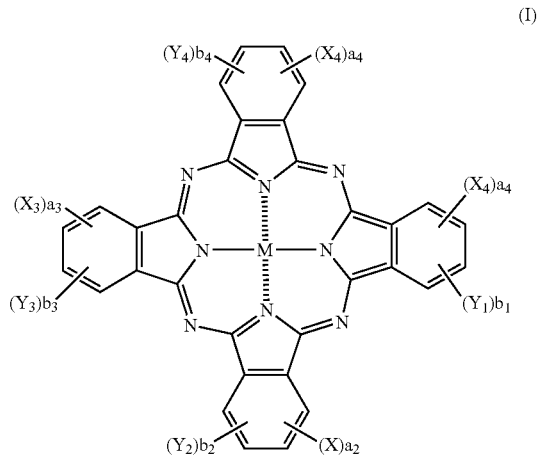

(3)

As a material for a member which constitutes an ink passage, a polymer resin is used from the viewpoints of cost, processability and functions. Examples thereof include a molded article of polyethylene or polypropylene (PP) and a film thereof, an elastomer of polystyrene isobutyl (PSIB) and PP, a modified polyphenylene ether (Zylon (trade name)) and a polyacetal. An additive component such as a stabilizer or an absorbent, as well as the above-mentioned antioxidant, can be added to these materials in an adequate amount as needed.

There is no particular limitation on the ink used in the ink jet printer of the invention, as long as it generally has characteristics which are applicable to the ink jet printer. Specifically, it is, for example, an ink composition comprising an aqueous medium composed of water or water and a water-soluble organic solvent, and a dye contained therein. Further, the ink composition which can be used in the invention can further contain a humectant, a viscosity-controlling agent, a pH adjuster or another additive.

Compounds preferably used as the dye are described below, but the dye of the ink used in the printer of the invention should not be construed as being limited thereto.

Preferred examples of cyan dyes include a phthalocyanine dye represented by the following general formula (I):

(I)

wherein $X_1$, $X_2$, $X_3$ and $X_4$ each independently represents —SO—Z or —SO$_2$—Z, and particularly, —SO$_2$—Z is preferred.

Each Z independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, and particularly, preferred are a substituted or unsubstituted alkyl group, a substituted or unsubstituted aryl group, and a substituted or unsubstituted heterocyclic group. Of these, preferred are a substituted alkyl group, a substituted aryl group and a substituted heterocyclic group, more preferred are a substituted alkyl group and a substituted aryl group, and most preferred is a substituted alkyl group.

The substituted or unsubstituted alkyl group represented by Z is preferably an alkyl group having 1 to 30 carbon atoms. Examples of the substituent groups include the same as the substituent groups in the case that Z, $Y_1$, $Y_2$, $Y_3$ and $Y_4$ may further have a substituent group, which are described below.

The substituted or unsubstituted cycloalkyl group represented by Z is preferably a cycloalkyl group having 5 to 30 carbon atoms. Examples of the substituent groups include the same as the substituent groups in the case that Z, $Y_1$, $Y_2$, $Y_3$ and $Y_4$ may further have a substituent group, which are described below.

The substituted or unsubstituted alkenyl group represented by Z is preferably an alkenyl group having 2 to 30 carbon atoms. Examples of the substituent groups include the same as the substituent groups in the case that Z, $Y_1$, $Y_2$, $Y_3$ and $Y_4$ may further have a substituent group, which are described below.

The substituted or unsubstituted aralkyl group represented by Z is preferably an aralkyl group having 7 to 30 carbon atoms. Examples of the substituent groups include the same as the substituent groups in the case that Z, $Y_1$, $Y_2$, $Y_3$ and $Y_4$ may further have a substituent group, which are described below.

The substituted or unsubstituted aryl group represented by Z is preferably an aryl group having 6 to 30 carbon atoms. Examples of the substituent groups include the same as the substituent groups in the case that Z, $Y_1$, $Y_2$, $Y_3$ and $Y_4$ may further have a substituent group, which are described below.

The heterocyclic group represented by Z is preferably a heterocyclic group having a 5-membered or 6-membered ring, and may be further cyclocondensed. Further, it may be either an aromatic heterocyclic group or a nonaromatic heterocyclic group. The heterocyclic groups represented by Z are exemplified below in the form of heterocycles with the substitution positions omitted, but the substitution positions are not limited. For example, pyridine can be substituted at the 2-, 3- and 4-positions. The heterocycles include pyridine, pyradine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperadine, imidazolidine and thiazoline. Above all, aromatic heterocyclic groups are preferred. When the heterocyclic groups are exemplified in the same manner as described above, preferred examples thereof include pyridine, pyradine, pyrimidine, pyridazine, triazine, pyrazole, imidazole, benzimidazole, triazole, thiazole, benzothiazole, isothiazole, benzisothiazole and thiadiazole.

These may have a substituent group, and examples of the substituent groups include the same as the substituent groups in the case that Z, $Y_1$, $Y_2$, $Y_3$ and $Y_4$ may further have a substituent group, which are described below.

$Y_1$, $Y_2$, $Y_3$ and $Y_4$ each independently represents a hydrogen atom, a halogen atom, an alkyl group, a cycloalkyl group, an alkenyl group, an aralkyl group, an aryl group, a heterocyclic group, a cyano group, a hydroxy group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group, a carboxy group or a sulfo group. Each group may further have a substituent group.

Above all, preferred are a hydrogen atom, a halogen atom, an alkyl group, an aryl group, a cyano group, an alkoxy group, an amido group, a ureido group, a sulfonamido group, a carbamoyl group, a alkoxycarbonyl group, a carboxy group and a sulfo group, particularly preferred are a hydrogen atom, a halogen atom, a cyano group, a carboxy group and a sulfo group, and most preferred is a hydrogen atom.

When Z, $Y_1$, $Y_2$, $Y_3$ and $Y_4$ are groups which may further have a substituent group, such substituent groups include a halogen atom (for example, a chlorine atom or a bromine atom); a straight-chain or branched alkyl group having 1 to 12 carbon atoms, an aralkyl group having 7 to 18 carbon atoms, an alkenyl group having 2 to 12 carbon atoms, a straight-chain or branched alkynyl group having 2 to 12 carbon atoms, a cycloalkyl group having 3 to 12 carbon atoms, which may have a side chain, and a cycloalkenyl group having 3 to 12 carbon atoms, which may have a side chain (specific examples of the above-mentioned groups include methyl, ethyl, propyl, isopropyl, t-butyl, 2-methylsulfonylethyl, 3-phenoxypropyl, trifuluromethyl and cyclopenthyl); an aryl group (for example, phenyl, 4-t-butylphenyl or 2,4-di-t-amylphenyl); a heterocyclic group (for example, imidazolyl, pyrazolyl, triazolyl, 2-furyl, 2-thienyl, 2-pyrimidinyl or 2-benzothiazolyl); an alkoxy group (for example, methoxy, ethoxy, 2-methoxyethoxy or 2-methylsulfonylethoxy); an aryloxy group (for example, phenoxy, 2-methylphenoxy, 4-t-butylphenoxy, 3-nitrophenoxy, 3-t-butyloxycarbonylphenoxy or 3-methoxycarbonylphenoxy); an acylamino group (for example, acetoamido, benzamido or 4-(3-t-butyl-4-hydroxyphenoxy)butanamido); an alkylamino group (for example, methylamino, butylamino, diethylamino or methylbutylamino); an anilino group (for example, phenylamino or 2-chloroanilino); a ureido group (for example, phenylureido, methylureido or N,N-dibutylureido); a sulfamoylamino group (for example, N,N-dipropylsulfamoylamino); an alkylthio group (for example, methylthio, octylthio or 2-phenoxyethylthio); an arylthio group (for example, phenylthio, 2-butoxy-5-t-octylphenylthio or 2-carboxyphenylthio); an alkyloxycarbonylamino group (for example, methoxycarbonylamino); a sulfonamido group (for example, methanesulfonamido, benzenesulfonamido or p-toluenesulfonamido); a carbamoyl group (for example, N-ethylcarbamoyl or N,N-dibutylcarbamoyl); a sulfamoyl group (for example, N-ethylsulfamoyl, N,N-dipropylsulfamoyl or N,N-diethylsulfamoyl); a sulfonyl group (for example, methylsulfonyl, octylsulfonyl, phenylsulfonyl or 4-methylphenylsulfonyl); an alkyloxycarbonyl group (for example, methoxycarbonyl or butyloxycarbonyl); a heterocyclic oxy group (for example, 1-phenyltetrazole-5-oxy or 2-tetrahydropyranyloxy); an azo group (for example, phenylazo, 4-methoxyphenylazo, 4-pivaloylaminophenylazo or 2-hydroxy-4-propanoylphenylazo); an acyloxy group (for example, acetoxy); a carbamoyloxy group (for example, N-methylcarbamoyloxy or N-phenylcarbamoyloxy); a silyloxy group (for example, trimethylsilyloxy or di-butylmethylsilyloxy); an aryloxycarbonylamino group (for example, phenoxycarbonylamino); an imido group (for example, N-succinimido or N-phthalimido), a heterocyclic thio group (for example, 2-benzothiazolylthio, 2,4-diphenoxy 1,3,5-triazole-6-thio or 2-pyridylthio); a sulfinyl group (for example, 3-phenoxypropylsulfinyl); a phosphonyl group (for example, phenoxyphosphonyl, octyloxyphosphonyl or phenylphosphonyl); an aryloxycarbonyl group (for example, phenoxycarbonyl); an acyl group (for example, acetyl, 3-phenylpropanoyl or benzoyl); an ionic hydrophilic group (for example, a carboxy group, a sulfo group or a quaternary ammonium group); a cyano group; a hydroxy group; a nitro group; and an amino group. Of these substituent groups, preferred are a hydroxy group, an alkoxy group, a sulfamoyl group, a sulfonamido group, an acylamino group, a carbamoyl group, a cyano group and an ionic hydrophilic group, and particularly preferred are a hydroxy group, a sulfamoyl group and an ionic hydrophilic group among others.

In general formula (I), $a_1$ to $a_4$ and $b_1$ to $b_4$ represent the substitution numbers of $X_1$ to $X_4$ and $Y_1$ to $Y_4$, respectively. $a_1$ to $a_4$ are each independently an integer of 0 to 4, and $b_1$ to $b_4$ are each independently an integer of 0 to 4. When $a_1$ to $a_4$ and $b_1$ to $b_4$ are an integer of 2 or more herein, the plurality of $X_1$ to $X_4$ and $Y_1$ to $Y_4$ groups may each be the same of different.

$a_1$ and $b_1$ meet the relation of $a_1+b_1=4$, and each independently represents an integer of 0 to 4. Particularly preferred is a combination of $a_1$ and $b_1$ in which $a_1$ represents 1 or 2 and $b_1$ represents 3 or 2, and most preferred of them is a combination of $a_1$ and $b_1$ in which $a_1$ represents 1 and $b_1$ represents 3.

$a_2$ and $b_2$ meet the relation of $a_2+b_2=4$, and each independently represents an integer of 0 to 4. Particularly preferred is a combination of $a_2$ and $b_2$ in which $a_2$ represents 1 or 2 and $b_2$ represents 3 or 2, and most preferred of them is a combination of $a_2$ and $b_2$ in which $a_2$ represents 1 and $b_2$ represents 3.

$a_3$ and $b_3$ meet the relation of $a_3+b_3=4$, and each independently represents an integer of 0 to 4. Particularly preferred is a combination of $a_3$ and $b_3$ in which $a_3$ represents 1 or 2 and $b_3$ represents 3 or 2, and most preferred of them is a combination of $a_3$ and $b_3$ in which $a_3$ represents 1 and $b_3$ represents 3.

$a_4$ and $b_4$ meet the relation of $a_4+b_4=4$, and each independently represents an integer of 0 to 4. Particularly preferred is a combination of $a_4$ and $b_4$ in which $a_4$ represents 1 or 2 and $b_4$ represents 3 or 2, and most preferred of them is a combination of $a_4$ and $b_4$ in which $a_4$ represents 1 and $b_4$ represents 3.

M represents a hydrogen atom, a metal element, a metal oxide, a metal hydroxide or a metal halide.

Preferred examples of M include Li, Na, K, Mg, Ti, Zr, V, Nb, Tar Cr, Mo, W, Mn, Fe, Ni, Ru, Rh, Pd, Os, Ir, Pt, Cu, Ag, Au, Zn, Cd, Hg, Al, Ga, In, Si, Ge, Sn, Pb, Sb and Bi as the metal element, as well as the hydrogen atom. The oxides preferably include VO and GeO. Further, the hydroxides preferably include $Si(OH)_2$, $Cr(OH)_2$ and $Sn(OH)_2$. Furthermore, the halides include AlCl, $SiCl_2$, VCl, $VCl_2$, VOCl, FeCl, GaCl and ZrCl. Above all, preferred are Cu, Ni, Zn and Al, and most preferred is Cu.

Further, in the phthalocyanine compound represented by general formula (I), Pcs (phthalocyanine rings) may form a dimer (for example, Pc-M-L-M-Pc) or a trimer through L (divalent connecting group), and a plurality of M's existing at that time may be the same or different.

The divalent connecting group represented by L is preferably an oxy group (—O—), a thio group (—S—), a carbonyl group (—CO—), a sulfonyl group (—SO$_2$—), and imino group (—NH—), a methylene group (—CH$_2$—) and a group formed by combining them.

In the above-mentioned general formula (I), the molecular weight of the phthalocyanine compound is preferably within the range of 750 to 3,000, more preferably within the range of 995 to 2,500, still more preferably from 995 to 2,000, and particularly most preferably within the range of 995 to 1,800.

When in the phthalocyanine compound represented by general formula (I), Pcs (phthalocyanine rings) form the dimer (for example, Pc-M-L-M-Pc) or the trimer through L (divalent connecting group), the preferred molecular weight, for example, the particularly preferred molecular weight, is twice (in the case of the dimer) or three times (in the case of the trimer) the above-mentioned particularly preferred molecular weight (within the range of 995 to 1,800). The preferred molecular weight of the above-mentioned dimer or trimer as used herein is a value including the connecting group L.

In the phthalocyanine compound represented by general formula (I), at least one of $X_1$, $X_2$, $X_3$, $X_4$, $Y_1$, $Y_2$, $Y_3$ and $Y_4$ is an ionic hydrophilic group or a group having an ionic hydrophilic group as a substituent group.

The ionic hydrophilic groups as the substituent group include a sulfo group (—SO$_3^-$X$^+$), a carboxy group (—CO$_2^-$X$^+$), a quaternary ammonium group (—N$^+$RR'R"X$^-$), an acylsulfamoyl group (—SO$_2$N$^+$X$^-$COR), a sulfonylcarbamoyl group (—CON$^+$X$^-$SO$_2$R) and a sulfonylsulfamoyl group (—SO$_2$N$^+$X$^-$SO$_2$R). Preferred are a sulfo group, a carboxy group and a quaternary ammonium group, and particularly preferred is a sulfo group. The sulfo group, the carboxy group, the acylsulfamoyl group, the sulfonylcarbamoyl group and the sulfonylsulfamoyl group may be in the form of salts, and examples of counter ions forming the salts include an alkali metal ion (for example, a sodium ion, a potassium ion or a lithium ion), an ammonium ion, an organic cation (for example, a tetramethylguanidium ion) and an organic and/or inorganic anion (for example, a halogen ion, a methanesulfonic acid ion or a benzenesulfonic acid ion). In the above-mentioned parentheses, X represents a hydrogen atom or a counter ion, and R, R' and R" each represents a substituent group.

In the phthalocyanine compound represented by general formula (I), at least one ionic hydrophilic group or group having the ionic hydrophilic group as the substituent group exists in one molecule, so that solubility or dispersibility in an aqueous medium is improved. From such as viewpoint, the phthalocyanine compound represented by general formula (I) is preferably one having at least two ionic hydrophilic groups in one molecule, more preferably one in which at least one of the plurality of the ionic hydrophilic groups is a sulfo group, and most preferably one having at least two sulfo groups in one molecule.

The preferred compound as the phthalocyanine compound represented by the above-mentioned general formula (I) is a compound having a combination of the following (a) to (f):

(a) It is preferred that $X_1$ to $X_4$ are each independently —SO$_2$—Z.

(b) Each Z independently represents a substituted or unsubstituted alkyl group, a substituted or unsubstituted aryl group, or a substituted or unsubstituted heterocyclic group. Of these, preferred are a substituted alkyl group, a substituted aryl group and a substituted heterocyclic group, and most preferred is a substituted alkyl group.

(c) $Y_1$ to $Y_4$ are each independently preferably a hydrogen atom, a halogen atom, an alkyl group, an aryl group, a cyano group, an alkoxy group, an amido group, a ureido group, a sulfonamido group, a carbamoyl group, a sulfamoyl group, a alkoxycarbonyl group, a carboxy group or a sulfo group. In particular, preferred are a hydrogen atom, a halogen atom, a cyano group, a carboxy group and a sulfo group, and most preferred is a hydrogen atom.

(d) $a_1$ to $a_4$ are each independently preferably 1 or 2, and particularly preferably 1. $b_1$ to $b_4$ are each independently preferably 3 or 2, and particularly preferably 3.

(e) M is preferably Cu, Ni, Zn or Al, and Cu is most preferred among others.

(f) The molecular weight of the phthalocyanine compound is preferably within the range of 750 to 2,500, more preferably within the range of 995 to 2,500, still more preferably from 995 to 2,000, and particularly most preferably within the range of 995 to 1,800.

As for the preferred combination of the substituent groups in the compound represented by the above-mentioned general formula (I), preferred is a compound in which at least one of various substituent groups is the above-mentioned preferred group, more preferred is a compound in which more of various substituent groups are the above-mentioned preferred groups, and most preferred is a compound in which all substituent groups are the above-mentioned preferred groups.

Of the phthalocyanine compounds represented by general formula (I), more preferred is a phthalocyanine compound having a structure represented by the following general formula (III). The phthalocyanine compound represented by general formula (III), which is used in the invention, will be described in detail below.

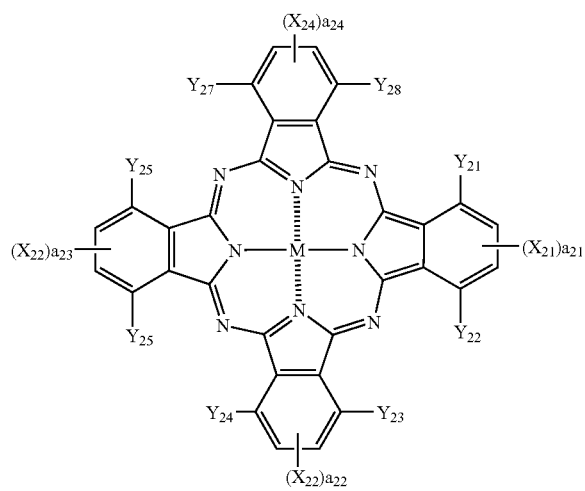

(III)

wherein $X_{21}$, $X_{22}$, $X_{23}$ and $X_{24}$ each independently represents —SO—Z or —SO$_2$—Z, and particularly, —SO$_2$—Z is preferred.

Z has the same meaning as that in general formula (I), and preferred examples thereof are also the same.

$Y_{21}$ to $Y_{28}$ each independently has the same meaning as $Y_1$, $Y_2$, $Y_3$ and $Y_4$ in general formula (I), and preferred examples thereof are also the same.

$a_{21}$ to $a_{24}$ meet $4 \leq a_{21}+a_{22}+a_{23}+a_{24} \leq 8$, preferably $4 \leq a_{21}+a_{22}+a_{23}+a_{24} \leq 6$, and each independently represents an integer of 1 or 2. Particularly preferred is the case of $a_{21}=a_{22}=a_{23}=a_{24}=1$.

M has the same meaning as that in the above-mentioned general formula (I).

At least one of $X_{21}$, $X_{22}$, $X_{23}$, $X_{24}$, $Y_{21}$, $Y_{22}$, $Y_{23}$, $Y_{24}$, $Y_{25}$, $Y_{26}$, $Y_{27}$ and $Y_{28}$ is an ionic hydrophilic group or a group having an ionic hydrophilic group as a substituent group.

Examples of the ionic hydrophilic groups have the same meaning as those of $X_1$, $X_2$, $X_3$ and $X_4$ in general formula (I), and preferred examples thereof are also the same.

In the phthalocyanine compound represented by general formula (III), at least one ionic hydrophilic group or group having the ionic hydrophilic group as the substituent group exists in one molecule, so that solubility or dispersibility in an aqueous medium is improved. From such as viewpoint, the phthalocyanine compound represented by general formula (III) is preferably one having at least two ionic hydrophilic groups in one molecule, more preferably one in which at least one of the plurality of the ionic hydrophilic groups is a sulfo group, and most preferably one having at least two sulfo groups in one molecule.

In the above-mentioned general formula (III), the molecular weight of the phthalocyanine compound is preferably within the range of 750 to 3,000, more preferably within the range of 995 to 2,500, still more preferably from 995 to 2,000, and particularly most preferably within the range of 995 to 1,800.

However, when in the phthalocyanine compound represented by general formula (III), Pcs (phthalocyanine rings) form a dimer (for example, Pc-M-L-M-Pc) or a trimer through L (divalent connecting group), the preferred molecular weight, for example, the particularly preferred molecular weight, is twice (in the case of the diner) or three times (in the case of the trimer) the above-mentioned particularly preferred molecular weight (within the range of 995 to 1,800). The preferred molecular weight of the above-mentioned dimer or trimer as used herein is a value including the connecting group L.

The preferred compound as the phthalocyanine compound represented by the above-mentioned general formula (III) is a compound having a combination of the following (a) to (f):

(a) It is preferred that $X_{21}$ to $X_{24}$ are each independently —SO$_2$—Z.

(b) Each Z independently represents a substituted or unsubstituted alkyl group, a substituted or unsubstituted aryl group, or a substituted or unsubstituted heterocyclic group. Of these, preferred are a substituted alkyl group, a substituted aryl group and a substituted heterocyclic group, and most preferred is a substituted alkyl group.

(c) $Y_{21}$ to $Y_{28}$ are each independently preferably a hydrogen atom, a halogen atom, an alkyl group, an aryl group, a cyano group, an alkoxy group, an amido group, an ureido group, a sulfonamido group, a carbamoyl group, a sulfamoyl group, a alkoxycarbonyl group, a carboxy group or a sulfo group. In particular, preferred are a hydrogen atom, a halogen atom, a cyano group, a carboxy group and a sulfo group, and most preferred is a hydrogen atom.

(d) $a_{11}$ to $a_{14}$ are each independently preferably 1 or 2, and particularly preferably $a_{11}=a_{12}=a_{13}=a_{14}=1$.

(e) M is preferably Cu, Ni, Zn or Al, and Cu is most preferred among others.

(f) The molecular weight of the phthalocyanine compound is preferably within the range of 750 to 2,500, more preferably within the range of 995 to 2,500, still more preferably from 995 to 2,000, and particularly most preferably within the range of 995 to 1,800.

As for the preferred combination of the substituent groups in the compound represented by the above-mentioned general formula (III), preferred is a compound in which at least one of various substituent groups is the above-mentioned preferred group, more preferred is a compound in which more of various substituent groups are the above-mentioned preferred groups, and most preferred is a compound in which all substituent groups are the above-mentioned preferred groups.

Of the phthalocyanine compounds represented by general formula (III), more preferred is a phthalocyanine compound having a structure represented by the following general formula (IV). The phthalocyanine compound represented by general formula (IV), which is used in the invention, will be described in detail below.

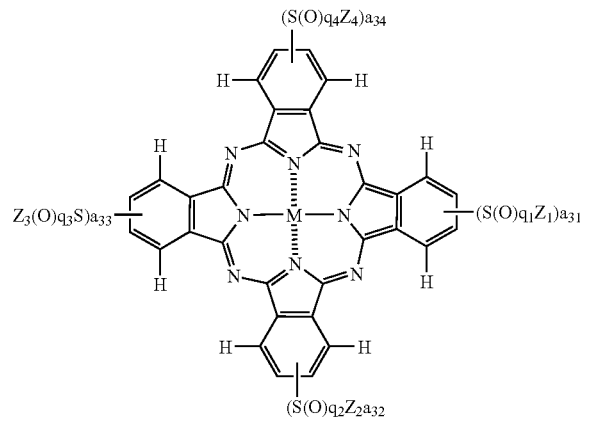

(IV)

wherein $Z_1$, $Z_2$, $Z_3$ and $Z_4$ each independently has the same meaning as Z in general formula (I), and preferred examples thereof are also the same.

$q_1$, $q_2$, $q_3$ and $q_4$ each independently represents an integer of 1 or 2, and particularly preferred is 2. Above all, most preferred is $q_1=q_2=q_3=q_4=2$.

$a_{31}$, $a_{32}$, $a_{33}$ and $a_{34}$ each independently represents an integer of 1 or 2, and particularly preferred is 1. Above all, most preferred is $a_{31}=a_{32}=a_{33}=a_{34}=1$.

M has the same meaning as that in the above-mentioned general formula (I).

At least one of $Z_1$, $Z_2$, $Z_3$ and $Z_4$ has an ionic hydrophilic group as a substituent group.

Examples of the ionic hydrophilic groups have the same meaning as those of Z in general formula (I), and preferred examples thereof are also the same.

The molecular weight of the phthalocyanine compound is preferably within the range of 750 to 2,500, more preferably within the range of 995 to 2,500, still more preferably from 995 to 2,000, and particularly most preferably within the range of 995 to 1,800.

Of the phthalocyanine compounds represented by general formula (I), which is used in the invention, a compound represented by the following general formula (II) is particularly preferred:

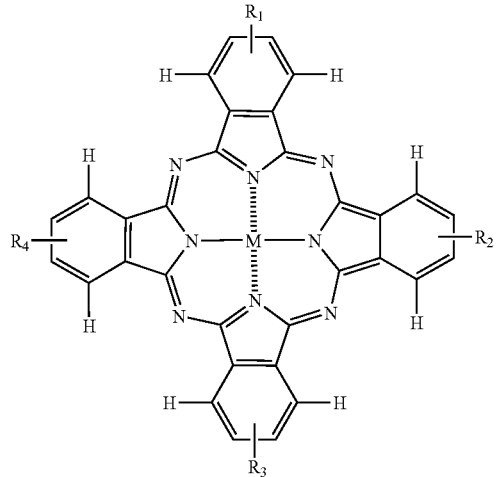

(II)

wherein M has the same meaning as in general formula (I), and $R_1$ to $R_4$ each independently represents —$SO_2Z$. Z has the same meaning as that in general formula (I), and preferred examples thereof are also the same. However, at least one of four Z groups has an ionic hydrophilic group as a substituent group.

Of the above-mentioned compounds, more preferred is a compound in which M in general formula (II) is a copper element, and Z having the ionic hydrophilic group as the substituent group is a sulfoalkyl group. Further preferred is a compound in which the sulfo group is in the form of a salt, and a counter cation forming the salt is a lithium cation.

A phthalocyanine compound represented by the following general formula (V), which can be used in the invention, is synthesized, for example, by reacting a phthalonitrile compound represented by the following general formula (VI) and/or a diiminoisoindoline represented by the following general formula (VII) with a metal derivative represented by M-$(Y)_d$. In the formulas, Z and $Z_1$ to $Z_4$ have the same meaning as Z in general formula (I), and M has the same meaning as that in general formula (I). Y represents a monovalent or divalent ligand such as a halogen atom, an acetate anion, an acetylacetonate and oxygen, and d is an integer 1 to 4. The metal derivatives represented by M-$(Y)_d$ include halides, carboxylic acid derivatives, sulfates, nitrates, carbonyl compounds, oxides and complexes of Al, Si, Ti, V, Mn, Fe, Co, Ni, Cu, Zn, Ge, Ru, Rh, Pd, In, Sn, Pt and Pb. Specific examples thereof include copper chloride, copper bromide, copper iodide, nickel chloride, nickel bromide, nickel acetate, cobalt chloride, cobalt bromide, cobalt acetate, iron chloride, zinc chloride, zinc bromide, zinc iodide, zinc acetate, vanadium chloride, vanadium oxytrichloride, palladium chloride, palladium acetate, aluminum chloride, manganese chloride, manganese acetate, acetylacetone manganese, manganese chloride, lead chloride, lead acetate, indium chloride, titanium chloride and tin chloride.

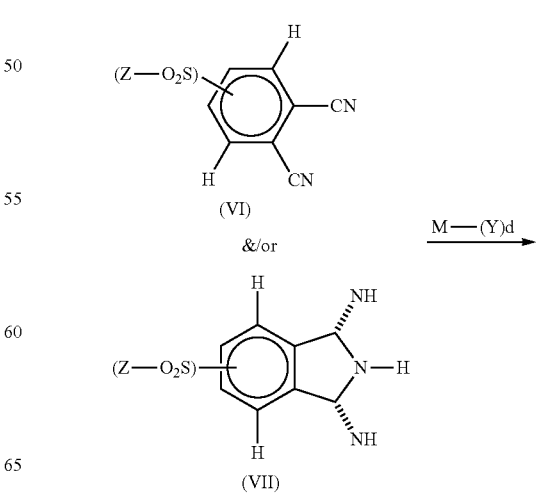

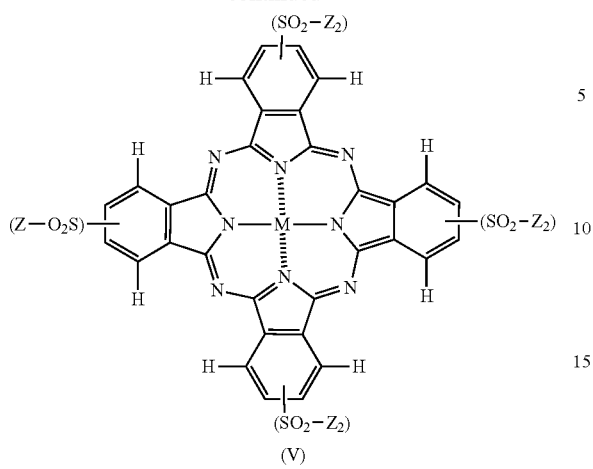

(V)

ⓘ indicates text missing or illegible when filed

The compound represented by the above-mentioned general formula (V), which is thus obtained, is usually a mixture of compounds represented by the following general formulas (a)-1 to (a)-4, the compounds being configurational isomers of $R_1$ ($SO_2$—$Z_1$), $R_2$ ($SO_2$—$Z_2$), $R_3$ ($SO_2$—$Z_3$) and $R_4$ ($SO_2$—$Z_4$).

Further, when two or more kinds of compounds having different substituent groups are used for general formula (VI) and/or general formula (VII) to prepare a dye, the compound represented by general formula (V) is a dye mixture of compounds different in the kind of substituent group and/or the position thereof.

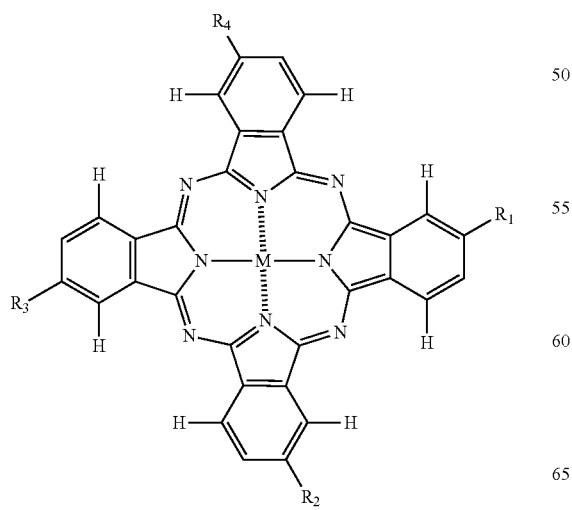

(a)-1

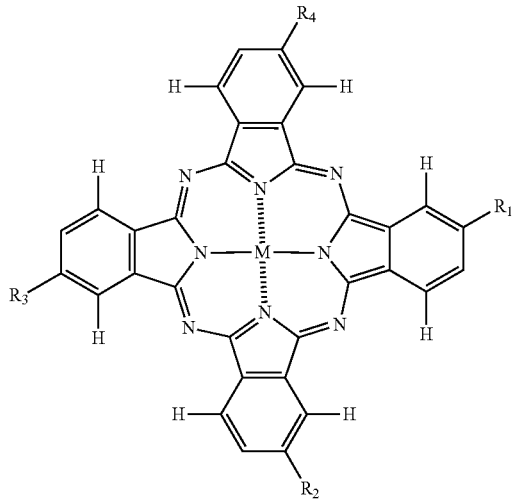

(a)-2

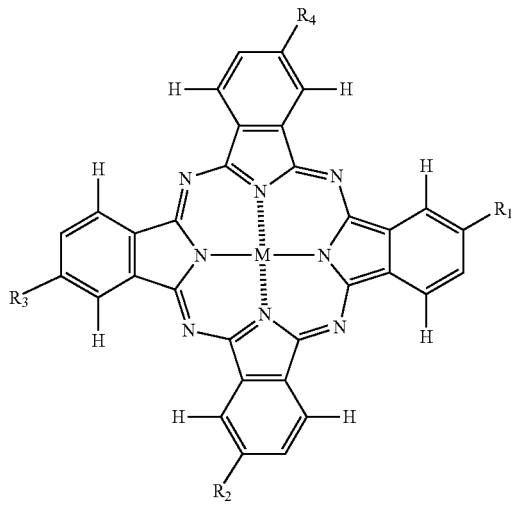

(a)-3

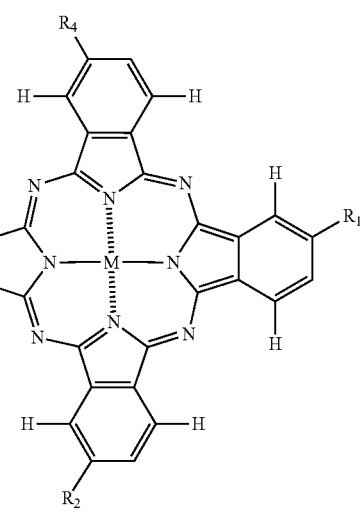

(a)-4

Examples of cyan dyes used in the invention include compounds having relevant structures described in JP 2002-249677 A, JP 2003-213167 A, JP 2003-213168 A and JP 2004-2670A, and particularly preferred exampled thereof are compounds shown in the following tables. The compounds described in Table 1 and Table 2 can be synthesized by the methods described in the above-mentioned publications or specifications. As a matter of course, starting compounds, dye intermediates and synthesis methods should not be construed as being limited thereto.

5-membered heterocycle, and an aliphatic ring, an aromatic ring or another heterocycle may be condensed with the heterocycle. Preferred examples of the heterocycles of A include a pyrazole ring, an imidazole ring, a thiazole ring, an isothiazole ring, a thiadiazole ring, a benzothiazole ring, a benzoxazole ring and a benzisothiazole ring. Each heterocycle may further have a substituent group. Above all, preferred are a

TABLE 1

In general formula (V):

| | M | $Z_1$ | $Z_2$ | $Z_3$ | $Z_4$ |
|---|---|---|---|---|---|
| Compound A | Cu | $-(CH_2)_3SO_3Na$ | $-(CH_2)_3SO_3Na$ | $-(CH_2)_3SO_3Na$ | $-(CH_2)_3SO_3Na$ |
| Compound B | Cu | $-(CH_2)_3SO_3Li$ | $-(CH_2)_3SO_3Li$ | $-(CH_2)_3SO_3Li$ | $-(CH_2)_3SO_3Li$ |
| Compound C | Cu | $-(CH_2)_3CO_2K$ | $-(CH_2)_3CO_2K$ | $-(CH_2)_3CO_2K$ | $-(CH_2)_3CO_2K$ |
| Compound D | Cu | $-CH_2CH(OH)CH_2SO_3Li$ | $-CH_2CH(OH)CH_2SO_3Li$ | $-CH_2CH(OH)CH_2SO_3Li$ | $-CH_2CH(OH)CH_2SO_3Li$ |
| Compound E | Cu | $-(CH_2)_2CH(CH_3)SO_3Li$ | $-(CH_2)_2CH(CH_3)SO_3Li$ | $-(CH_2)_2CH(CH_3)SO_3Li$ | $-(CH_2)_2CH(CH_3)SO_3Li$ |

TABLE 2

In the following formula:

$$M-Pa\begin{matrix}(SO_2R_1)n\\(SO_2R_2)m\end{matrix} = RSO_2-\text{[phthalocyanine structure]}-SO_2R$$

| | M | $R_1$ | n | $R_2$ | m |
|---|---|---|---|---|---|
| Compound F | Cu | $-(CH_2)_3SO_3Li$ | 3 | $-(CH_2)_3SO_2NHCH_2CH(OH)CH_3$ | 1 |
| Compound G | Cu | $-(CH_2)_3SO_3Li$ | 2 | $-(CH_2)_3SO_2NHCH_2CH(OH)CH_3$ | 2 |
| Compound H | Cu | $-(CH_2)_3SO_3Li$ | 3 | $-(CH_2)_3SO_2NHCH(CH_3)CH_2(OH)$ | 1 |
| Compound I | Cu | $-(CH_2)_3SO_3Li$ | 2 | $-(CH_2)_3SO_2NHCH(CH_3)CH_2(OH)$ | 2 |
| Compound J | Cu | $-(CH_2)_3SO_3Li$ | 3 | $-(CH_2)_3SO_2N(C_2H_4OH)_2$ | 1 |
| Compound K | Cu | $-(CH_2)_3SO_3Li$ | 3 | $-(CH_2)_6CO_2Li$ | 1 |

In Table 2, the order of introduction positions of respective substituent groups of ($SO_2R_1$) and ($SO_2R_2$) is random.
(Isomers represented by the above-mentioned (a)-1 to (a)-4 are indicated.)
The symbols m and n are based on charging molar ratios of phthalonitrile derivatives used in the synthesis of the phthalonitrile derivatives.

As a magenta dye, there can be preferably used a compound represented by the following general formula (VI):

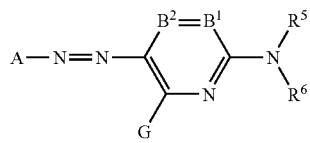

(VI)

wherein A represents a residue of a 5-membered heterocyclic diazo component A-$NH_2$.

Examples of heteroatoms of the 5-membered heterocycles include N, O and S. Preferred is a nitrogen-containing pyrazole ring, an imidazole ring, an isothiazole ring, a thiadiazole ring and a benzothiazole ring represented by the following general formulas (a) to (f):

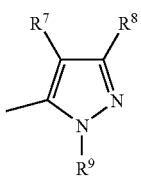

(a)

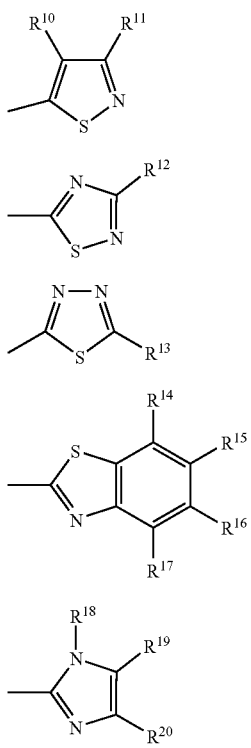

wherein R[7] to R[20] represent the same substituent groups as substituent groups G. R[1] and R[2] described below. Of the above-mentioned general formulas (a) to (f), preferred are a pyrazole ring and an isothiazole ring represented by general formulas (a) and (b), and most preferred is a pyrazole ring represented by general formula (a).

B[1] and B[2] represent —CR[1]= and —CR[2]=, respectively, or one of them represents a nitrogen atom and the other represents —CR[1]= and —CR[2]=. However, it is more preferred that B[1] and B[2] represent —CR[1]= and —CR[2]=, respectively.

R[5] and R[6] each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group. Each group may further have a substituent group. Preferred examples of the substituent groups represented by R[5] and R[6] include a hydrogen atom, an aliphatic group, an aromatic group, a heterocyclic group, an acyl group, an alkylsulfonyl group and an arylsulfonyl group. More preferred are a hydrogen atom, an aromatic group, a heterocyclic group, an acyl group, an alkylsulfonyl group and an arylsulfonyl group, and most preferred is a hydrogen atom, an aryl group or a heterocyclic group. Each group may further have a substituent group. However, R[5] and R[6] are not hydrogen atoms at the same time.

G, R[1] and R[2] each independently represents a hydrogen atom, a halogen atom, an aliphatic group, an aromatic group, a heterocyclic group, a cyano group, a carboxy group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted by an alkyl group, an aryl group or a heterocyclic group, an acylamino group, a ureide group, a sulfamoylamino group, an alkoxyl-carbonylamino group, an aryloxycarbonylamino group, an alkylsulfonylamino group, an arylsulfonylamino group, a nitro group, an alkylthio group, an arylthio group, a heterocyclic thio group, an alkylsulfonyl group, an arylsulfonyl group, an alkylsulfinyl group, an arylsulfinyl group, a sulfamoyl group or a sulfo group, and each group may be further substituted.

Preferred examples of the substituent groups represented by G include a hydrogen atom, a halogen atom, an aliphatic group, an aromatic group, a hydroxy group, an alkoxy group, an aryloxy group, an acyloxy group, a heterocyclic oxy group, an amino group substituted by an alkyl group, an aryl group or a heterocyclic group, an acylamino group, a ureide group, a sulfamoylamino group, an alkoxyl carbonylamino group, an aryloxycarbonylamino group, an alkylthio group, an arylthio group and a heterocyclic thio group. More preferred are a hydrogen atom, a halogen atom, an alkyl group, a hydroxy group, an alkoxy group, an aryloxy group, an acyloxy group, an amino group substituted by an alkyl group, an aryl group or a heterocyclic group, and an acylamino group, and most preferred are a hydrogen atom, an arylamino group and an amido group among others. Each group may further have a substituent group.

Preferred examples of the substituent groups represented by R[1] and R[2] include a hydrogen atom, an alkyl group, an alkoxycarbonyl group, a carboxy group, a carbamoyl group and a cyano group. Each group may further have a substituent group. R[1] and R[5], or R[5] and R[6] may be combined with each other to form a 5- or 6-membered ring. When the groups represented by A, R[1], R[2], R[5], R[6] and G each further has a substituent group, the substituent groups include those mentioned for G, R[1] and R[2] described above.

When an azo dye represented by formula (VI) is a water-soluble dye, it is preferred that an ionic hydrophilic group is further provided as a substituent group at any position of A, R[1], R[2], R[5], R[6] and G. The ionic hydrophilic groups as the substituent groups include a sulfo group, a carboxy group and a quaternary ammonium group. A carboxy group and a sulfo group are preferred as the ionic hydrophilic group, and a sulfo group is particularly preferred. The carboxy group and the sulfa group may be in the form of salts. Examples of counter ions forming the salts include and examples of counter ions forming the salts include an alkali metal ion (for example, a sodium ion, a potassium ion or a lithium ion), an ammonium ion and an organic cation (for example, a tetramethylammonium or tetramethylguanidium ion).

The substituent groups represented by G, R[1] and R[2] will be described in detail below.

The halogen atoms include a fluorine atom, a chlorine atom and a bromine atom.

In general formula (VI), the aliphatic group means an alkyl group, a substituted alkyl group, an alkenyl group, a substituted alkenyl group, an alkynyl group, a substituted alkynyl group, an aralkyl group or a substituted aralkyl group. The aliphatic group may be branched or may form a ring. The carbon atom number of the aliphatic group is preferably from 1 to 20, and more preferably from 1 to 16. Aryl moieties of the aralkyl and substituted aralkyl groups are preferably phenyl or naphthyl, and particularly preferably phenyl. Examples of the aliphatic groups include a methyl group, an ethyl group, a butyl group, an isopropyl group, a t-butyl group, a hydroxyethyl group, a methoxyethyl group, a cyanoethyl group, a trifluoromethyl group, a 3-sulfopropyl group, a 4-sulfobutyl group, a cyclohexyl group, a benzyl group, a 2-phenetyl group, a vinyl group and an allyl group.

In general formula (VI), the aromatic group means an aryl group or a substituted aryl group. The aryl group is preferably phenyl or naphthyl, and particularly preferably phenyl. The carbon atom number of the aromatic group is preferably from 6 to 20, and more preferably from 6 to 16. Examples of the aromatic groups include phenyl, p-tolyl, p-methoxyphenyl, o-chlorophenyl and m-(3-sulfopropylamino)phenyl. The heterocyclic groups include a substituent group-containing heterocyclic group and an unsubstituted heterocyclic group. An aliphatic ring, an aromatic ring or another heterocyclic ring may be condensed with the heterocycle. As the heterocyclic group, a 5- or 6-membered heterocyclic group is preferred. Examples of the substituent groups include an aliphatic group, a halogen atom, an alkylsulfonyl group, an arylsulfonyl group, an acyl group, an acylamino group, a sulfamoyl group, a carbamoyl group and an ionic hydrophilic group. Examples of the heterocyclic groups include a 2-pyridyl group, a 2-thienyl group, a 2-thiazolyl group, a 2-benzothiazolyl group, a 2-benzoxazolyl group and a 2-furyl group.

The carbamoyl groups include a substituent group-containing carbamoyl group and an unsubstituted carbamoyl group. Examples of the substituent groups include an alkyl group. Examples of the carbamoyl groups include methylcarbamoyl group and a dimethylcarbamoyl group.

The alkoxycarbonyl groups include a substituent group-containing alkoxycarbonyl group and an unsubstituted alkoxycarbonyl group. As the alkoxycarbonyl group, an alkoxycarbonyl group having 2 to 12 carbon atoms is preferred. Examples of the substituent groups include an ionic hydrophilic group. Examples of the alkoxycarbonyl groups include a methoxycarbonyl group and an ethoxycarbonyl group.

The aryloxycarbonyl groups include a substituent group-containing aryloxycarbonyl group and an unsubstituted aryloxycarbonyl group. As the aryloxycarbonyl group, an aryloxycarbonyl group having 7 to 12 carbon atoms is preferred. Examples of the substituent groups include an ionic hydrophilic group. Examples of the aryloxycarbonyl groups include a phenoxycarbonyl group.

The acyl groups include a substituent group-containing acyl group and an unsubstituted acyl group. As the acyl group, an acyl group having 1 to 12 carbon atoms is preferred. Examples of the substituent groups include an ionic hydrophilic group. Examples of the acyl groups include an acetyl group and a benzoyl group.

The alkoxy groups include a substituent group-containing alkoxy group and an unsubstituted alkoxy group. As the alkoxy group, an alkoxy group having 1 to 12 carbon atoms is preferred. Examples of the substituent groups include an alkoxy group, a hydroxy group and an ionic hydrophilic group. Examples of the alkoxy groups include a methoxy group, an ethoxy group, an isopropoxy group, a methoxyethoxy group, a hydroxyethoxy group and a 3-carboxypropoxy group.

The aryloxy groups include a substituent group-containing aryloxy group and an unsubstituted aryloxy group. As the aryloxy group, an aryloxy group having 6 to 12 carbon atoms is preferred. Examples of the substituent groups include an alkoxy group and an ionic hydrophilic group. Examples of the aryloxy groups include a phenoxy group, a p-methoxyphenoxy group and an o-methoxyphenoxy group.

The acyloxy groups include a substituent group-containing acyloxy group and an unsubstituted acyloxy group. As the acyloxy group, an acyloxy group having 1 to 12 carbon atoms is preferred. Examples of the substituent groups include an ionic hydrophilic group. Examples of the acyloxy groups include an acetoxy group and a benzoyloxy group.

The carbamoyloxy groups include a substituent group-containing carbamoyloxy group and an unsubstituted carbamoyloxy group. Examples of the substituent groups include an alkyl group. Examples of the carbamoyloxy groups include an N-methylcarbamoyloxy group.

The substituent group of the amino group substituted by an alkyl group, an aryl group or a heterocyclic group may further have a substituent group. An unsubstituted amino group is not included. As the alkylamino group, an alkylamino group having 1 to 6 carbon atoms is preferred. Examples of the substituent groups include an ionic hydrophilic group. Examples of the alkylamino groups include a methylamino group and a diethylamino group. The arylamino groups include a substituent group-containing arylamino group and an unsubstituted arylamino group. As the arylamino group, an arylamino group having 6 to 12 carbon atoms is preferred. Examples of the substituent groups include a halogen atom and an ionic hydrophilic group. Examples of the arylamino groups include an anilino group and a 2-chloroanilino group.

The acylamino groups include a substituent group-containing acylamino group. As the above-mentioned acylamino group, an acylamino group having 2 t 12 carbon atoms is preferred. Examples of the substituent groups include an ionic hydrophilic group. Examples of the arylamino groups include an acetylamino group, a propionylamino group, a benzoylamino group, an N-phenylacetylamino group and a 3,5-disulfobenzoylamino group.

The ureido groups include a substituent group-containing ureido group and an unsubstituted ureido group. As the above-mentioned ureido group, a ureido group having 1 to 12 carbon atoms is preferred. Examples of the substituent groups include an alkyl group and an aryl group. Examples of the ureido groups include a 3-methylureido group, a 3,3-dimethylureido group and a 3-phenylureido group.

The sulfamoylamino groups include a substituent group-containing sulfamoylamino group and an unsubstituted sulfamoylamino group. Examples of the substituent groups include an alkyl group. Examples of the sulfamoylamino groups include an N,N-dipropylsulfamoylamino group.

The alkoxycarbonylamino groups include a substituent group-containing alkoxycarbonylamino group and an unsubstituted alkoxycarbonylamino group. As the alkoxyl-carbonylamino group, an alkoxycarbonylamino group having 2 to 12 carbon atoms is preferred. Examples of the substituent groups include an ionic hydrophilic group. Examples of the alkoxycarbonylamino groups include an ethoxycarbonylamino group.

The aryloxycarbonylamino groups include a substituent group-containing aryloxycarbonylamino group and an unsubstituted aryloxycarbonylamino group. As the aryloxylcarbonylamino group, an aryloxycarbonylamino group having 7 to 12 carbon atoms is preferred. Examples of the substituent groups include an ionic hydrophilic group. Examples of the above-mentioned aryloxycarbonylamino groups include a phenoxycarbonylamino group.

The alkylsulfonylamino and arylsulfonylamino groups include a substituent group-containing alkylsulfonylamino and arylsulfonylamino groups and an unsubstituted alkylsulfonylamino and arylsulfonylamino groups. As the sulfonylamino group, a sulfonylamino group having 1 to 12 carbon atoms is preferred. Examples of the substituent groups include an ionic hydrophilic group. Examples of the sulfonylamino groups include a methanesulfonylamino group, an N-phenylmethanesulfonylamino group, a benzenesulfonylamino group and a 3-carboxybenzenesulfonylamino group.

The alkylthio, arylthio and heterocyclic thio groups include a substituent group-containing alkylthio, arylthio and heterocyclic thio groups and an unsubstituted alkylthio, arylthio and heterocyclic thio groups. As the alkylthio, arylthio and heterocyclic thio groups, ones having 1 to 12 carbon atoms are preferred. Examples of the substituent groups include an ionic hydrophilic group. Examples of the alkylthio, arylthio and heterocyclic thio groups include a methylthio group, a phenylthio group and a 2-pyridylthio group.

Examples of the alkylsulfonyl and arylsulfonyl groups include a methanesulfonyl group and a phenylsulfonyl group, respectively. Examples of the alkylsulfinyl and arylsulfinyl groups include a methanesulfinyl group and a phenylsulfinyl group, respectively.

The sulfamoyl groups include a substituent group-containing sulfamoyl group and an unsubstituted sulfamoyl group. Examples of the substituent groups include an alkyl group. Examples of the sulfamoyl groups include a dimethylsulfamoyl group and a di-(2-hydroxyethyl)sulfamoyl group.

In the invention, the particularly preferred azo dye is one represented by the following general formula (VII):

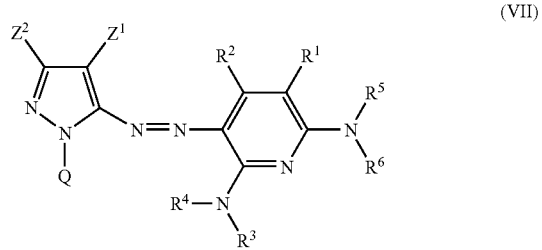

(VII)

wherein $Z^1$ represents an electron attractive group having a Hammett substituent constant σp value of 0.20 or more. $Z^1$ is preferably an electron attractive group having a σp value of 0.30 to 1.0. Preferred specific examples of the substituent groups include electron attractive substituent groups described below. Above all, preferred are an acyl group having 2 to 12 carbon atoms, an alkyloxycarbonyl group having 2 to 12 carbon atoms, a nitro group, a cyano group, an alkylsulfonyl group having 1 to 12 carbon atoms, an arylsulfonyl group having 6 to 18 carbon atoms, a carbamoyl group having 1 to 12 carbon atoms and an alkyl halide group having 1 to 12 carbon atoms. Particularly preferred are a cyano group, an alkylsulfonyl group having 1 to 12 carbon atoms and an arylsulfonyl group having 6 to 18 carbon atoms, and most preferred is a cyano group.

$R^1$, $R^2$, $R^5$ and $R^6$ have the same meanings as in the case of general formula (VI). $R^3$ and $R^4$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group. Above all, preferred are a hydrogen atom, an aromatic group, a heterocyclic group, an acyl group, an alkylsulfonyl group and an arylsulfonyl group, and particularly preferred are a hydrogen atom, an aromatic group and a heterocyclic group. $Z^2$ represents a hydrogen atom, an aliphatic group, an aromatic group or a heterocyclic group.

Q represents a hydrogen atom, an aliphatic group, an aromatic group or a heterocyclic group. Above all, Q is preferably a group comprising non-metal atom groups necessary to form a 5- to 8-membered ring. The 5- to 8-membered ring may be substituted, may be a saturated ring, or may have an unsaturated bond. Of these, an aryl group or a heterocyclic group is particularly preferred. Preferred examples of the non-metal atoms include a nitrogen atom, an oxygen atom, a sulfur atom and a carbon atom. Specific examples of the 5- to 8-membered rings include a benzene ring, a cyclopentane ring, a cyclohexane ring, a cycloheptane ring, a cyclooctane ring, a cyclohexene ring, a pyridine ring, a pyrimidine ring, a pyrazine ring, a pyridazine ring, a triazine ring, an imidazole ring, a benzimidazole ring, an oxazole ring, a benzoxazole ring, a thiazole ring, a benzothiazole ring, an oxane ring, a sulfolane ring and a thiane ring.

Each group described for general formula (VII) may further have a substituent group. When any of these groups have a substituent, the substituent group include the substituent groups described for general formula (VI), the groups illustrated for G, $R^1$ and $R^2$, and the ionic hydrophilic group.

With reference to the substituent group $Z^1$, the Hammett substituent constant σp value used in this specification will be described. The Hammett rule is an empirical rule which was proposed by L. P. Hammett in 1935 in order to quantitatively examine the effect of a substituent group on a reaction of or equilibrium of a benzene derivative, and the validity thereof has been widely approved at present. The substituent constants determined by the Hammett rule include a σp value and a σm value, and these values can be found in many general documents. They are described in detail, for example, in Lange's Handbook of Chemistry, 12th Edition, edited by J. A. Dean, 1979 (McGraw Hill) and Kagaku no Ryoiki (Region of Chemistry), Zokan (Extra Edition), Vol. 122, pages 96 to 103, 1979 (Nankodo). Each substituent group is limited or described by the Hammett substituent constant σp in the invention. However, each substituent group is of course not limited to only the substituent group whose Hammett substituent constant value is known in the above-mentioned documents, but also includes a substituent group whose value will fall within the above range when measured based on the Hammett rule, even when the value is unknown in the literature. Further, general formulas (VI) and (VII) include a compound which is not the benzene derivative, but the σp value is used as a measure for indicating the electron effect of the substituent group, independently of the substitution position. In the invention, the σp value is used in such a sense.

The electron attractive groups having a Hammett substituent constant σp value of 0.60 or more include a cyano group, a nitro group, an alkylsulfonyl group (for example, a methanesulfonyl group) and an arylsulfonyl group (for example, a benzenesulfonyl group). The electron attractive groups having a Hammett σp value of 0.45 or more include, in addition to the above, an acyl group (for example, an acetyl group), an alkoxycarbonyl group (for example, a dodecyloxycarbonyl group), an aryloxycarbonyl group (for example, m-chlorophenoxy-carbonyl), an alkylsulfinyl group (for example, n-propyl-sulfinyl), an arylsulfinyl group (for example, phenylsulfinyl), a sulfamoyl group (for example, N-ethylsulfamoyl or N,N-dimethylsulfamoyl) and an alkyl halide (for example, trifluoromethyl).

The electron attractive groups having a Hammett substituent constant σp value of 0.30 or more include, in addition to the above, an acyloxy group (for example, acetoxy), a carbamoyl group (for example, N-ethylcarbamoyl or N,N-dibutylcarbamoyl), an alkoxy halide (for example, trifluoromethyloxy), an aryloxy halide (for example, pentafluorophenyloxy), a sulfonyloxy group (for example, methylsulfonyloxy group), an alkylthio halide (for example difluoromethylthio), an aryl group substituted by two or more electron attractive groups having a σp value of 0.15 or more (for example, 2,4-dinitrophenyl or pentachlorophenyl) and a heterocyclic ring (for example, 2-benzoxazolyl, 2-benzothiazolyl or 1-phenyl-2-benzimidazolyl). Specific examples of the electron attractive groups having a σp value of 0.20 or more include, in addition to the above, a halogen atom.

Combinations of the substituent groups which are particularly preferred as the azo dye represented by the above-mentioned general formula (VI) are as follows:
(a) $R^5$ and $R^6$ are preferably hydrogen atoms, alkyl groups, aryl groups, heterocyclic group, sulfonyl groups or acyl groups, more preferably, hydrogen atoms, aryl groups, heterocyclic groups or sulfonyl groups, and most preferably, hydrogen atoms, aryl groups or heterocyclic groups. However, $R^5$ and $R^6$ are not hydrogen atoms at the same time.
(b) G is preferably a hydrogen atom, a halogen atom, an alkyl group, a hydroxy group, an amino group or an amido group, more preferably, a hydrogen atom, a halogen atom, an amino group or an amido group, and most preferably, a hydrogen atom, an amino group or an amido group.
(c) A is preferably a pyrazole ring, an imidazole ring, a isothiazole ring, a thiadiazole ring or a benzothiazole ring, more preferably, a pyrazole ring or an isothiazole ring, and most preferably, a pyrazole ring.
(d) $B^1$ and $B^2$ are —$CR^1$= and —$CR^2$=, independently, wherein $R^1$ and $R^2$ are each preferably a hydrogen atom, a halogen atom, a cyano group, a carbamoyl group, a carboxyl group, an alkyl group, a hydroxy group, or an alkoxy group, and more preferably, a hydrogen atom, a cyano group, a carbamoyl group or an alkyl group.

For a preferred combination of the substituent groups in the compound represented by general formula (VI), preferred is a compound in which at least one of the various substituent groups is the above-mentioned preferred group. More preferred is a compound in which more of the various substituent groups are the above-mentioned preferred groups, and most preferred is a compound in which all of the substituent groups are the above-mentioned preferred groups.

The compound represented by the above-mentioned general formula (VI) may be produced by any methods, for example, by a method described below;

(a) A compound represented by the following general formula (VIII) is reacted with a diazotizing agent to form a diazonium salt.
(b) The diazonium salt formed in the above-mentioned step (a) is reacted with a coupling agent represented by the following general formula (IX) to form a compound represented by the above-mentioned general formula (VI).
(c) In the presence of a base, the compound formed in the above-mentioned step (b) is reacted with an alkylating agent, an arylating agent or a heterylating agent to form a compound represented by the above-mentioned general formula (VI) in which a substituent group such as an alkyl group is introduced.

A-NH$_2$ (VIII)

(IX)

wherein A, G, $B^1$, $B^2$, $R^5$ and $R^6$ have the same meanings as in the case of the above-mentioned general formula (VI).

Further, when a water-soluble group is introduced into the compound of the above-mentioned general formula (VI), an electrophillic reaction is employed the electrophillic reactions include sulfonation, the Mannich reaction and the Friedel-Crafts reaction, and sulfonation is preferred among others.

Specific examples of the compounds represented by general formula (VI) which can be preferably used in the invention are shown below:

TABLE 3

| Dye | $R_1$ | $R_2$ | $R_3$ | $R_4$ |
|---|---|---|---|---|
| 1 | 2-methylbenzothiazol-6-yl-SO$_3$Na | 2-methylbenzothiazol-6-yl-SO$_3$Na | 2,4,6-trimethyl-3-SO$_3$Na-phenyl | 2,4,6-trimethyl-3-SO$_3$Na-phenyl |
| 2 | 2-methylbenzothiazol-6-yl-SO$_2$NH-(3,5-di-COOK)phenyl | 2-methylbenzothiazol-6-yl | 2,4,6-trimethyl-3-SO$_3$K-phenyl | 2,4,6-trimethyl-3-SO$_3$K-phenyl |

TABLE 3-continued
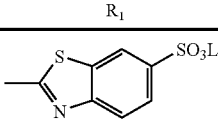
| Dye | R₁ | R₂ | R₃ | R₄ |
| --- | --- | --- | --- | --- |
| 3 | 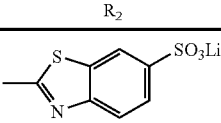 | 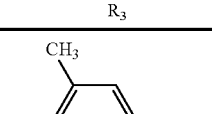 | 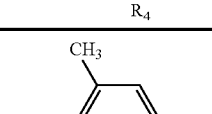 | 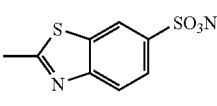 |
| 4 | 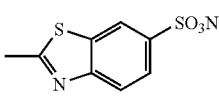 | 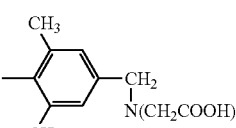 | 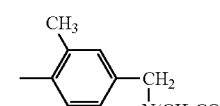 | 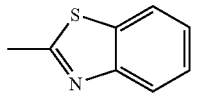 |
TABLE 4
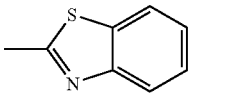
| Dye | R₁ | R₂ | R₃ | R₄ |
| --- | --- | --- | --- | --- |
| 5 | 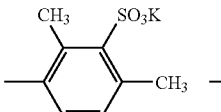 | 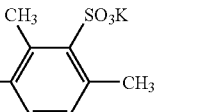 | 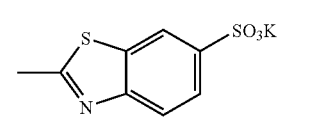 | 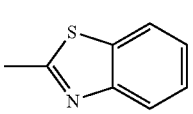 |
| 6 | 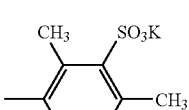 | 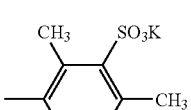 | 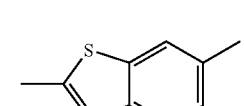 | 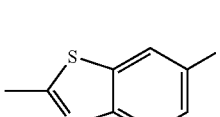 |
| 7 | 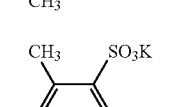 | 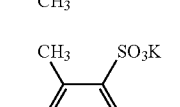 | | |

TABLE 5
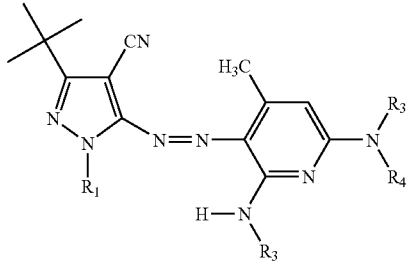
| Dye | R₁ | R₂ | R₃ | R₄ |
|---|---|---|---|---|
| 8 | 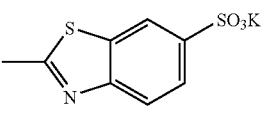 | 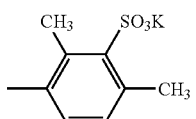 | 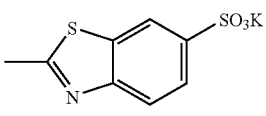 | 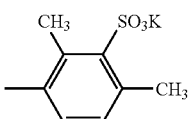 |
| 9 | 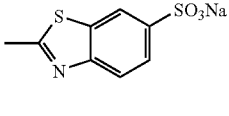 | 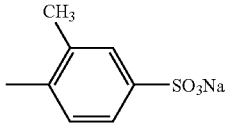 | 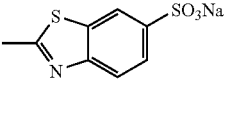 | 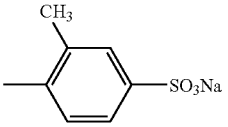 |
| 10 | 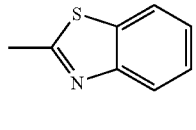 | 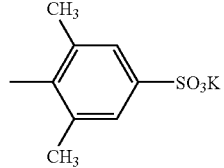 | 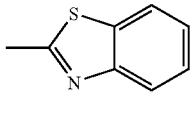 | 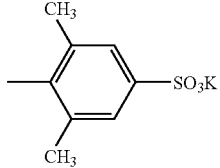 |
| 11 | 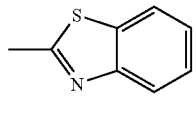 | 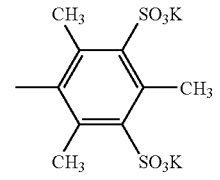 | 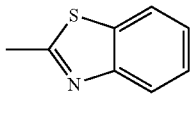 | 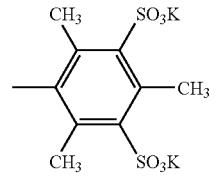 |
| 12 | 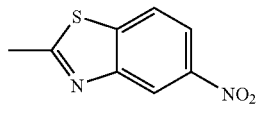 | 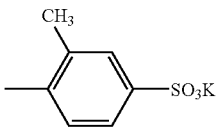 | 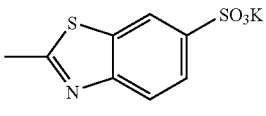 | 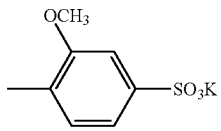 |

TABLE 6
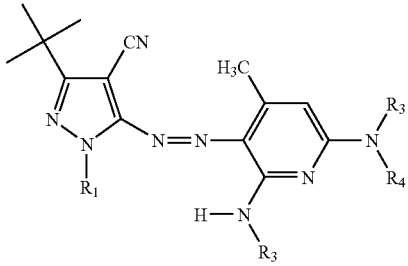
| Dye | R₁ | R₂ | R₃ | R₄ |
|---|---|---|---|---|
| 13 | 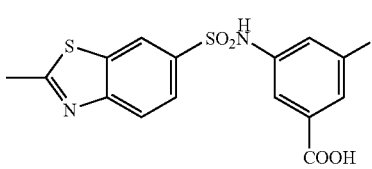 | 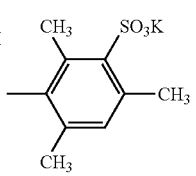 | 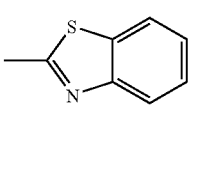 | 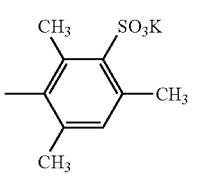 |
| 14 | 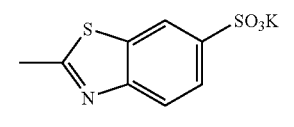 | 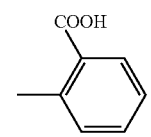 | 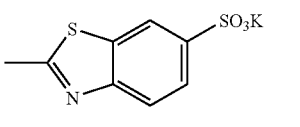 | 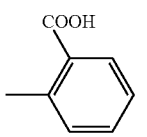 |
| 15 | 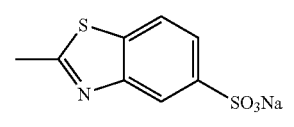 | 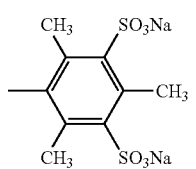 | 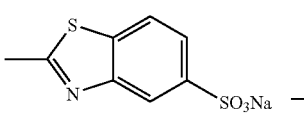 | 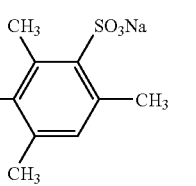 |
| 16 | 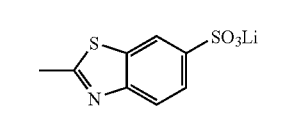 | 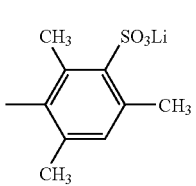 | 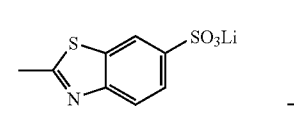 | 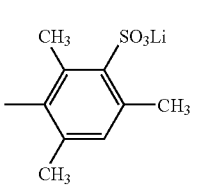 |
| 17 | 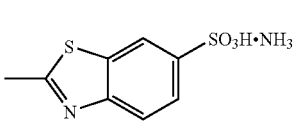 | 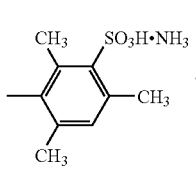 | 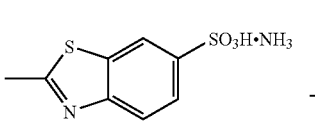 | 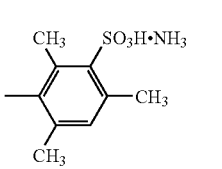 |

TABLE 7

| Dye | R₁ | R₂ | R₃ | R₄ | R₅ | R₆ |
|---|---|---|---|---|---|---|
| b-1 | CH₃ | H | CN | H | —⟨C₆H₄⟩—SO₃Na | —⟨C₆H₄⟩—SO₃Na |
| b-2 | CH₃ | H | H | SO₂CH₃ | —⟨C₆H₃(CH₃)⟩—SO₃Na | —⟨C₆H₃(CH₃)⟩—SO₃Na |

TABLE 8

| Dye | R₁ | R₂ | R₃ | R₄ | R₅ | R₆ |
|---|---|---|---|---|---|---|
| c-1 | —C₆H₄—CH₃ | H | CONH₂ | H | —⟨C₆H₄⟩—SO₃K | —⟨C₆H₄⟩—SO₃K |
| c-2 | —S—CH₂CH₂—SO₃K | CH₃ | H | 2-methylbenzothiazol-6-yl-SO₃K | —⟨C₆H₄⟩—SO₃K | —⟨C₆H₄⟩—SO₃K |

Black dyes which can be suitably used in the invention include a compound represented by the following formula (4) and a salt thereof;

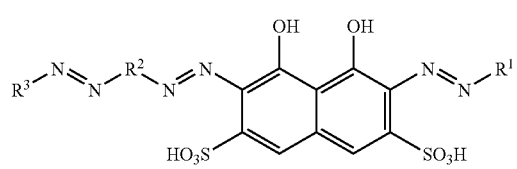

(4)

wherein $R^1$ represents a substituent group-containing phenyl group or a substituent group-containing naphthyl group; $R^2$ represents a substituent group-containing phenylene group or a substituent group-containing naphthylene group; and $R^3$ represents a 5- to 7-membered heterocyclic group having at least one double bond and substituent group. Further, the above-mentioned substituent groups in $R^1$ to $R^3$ each independently represents a group selected from the group consisting of OH, $SO_3H$, $PO_3H_2$, $CO_2H$, $NO_2$, $NH_2$, a C1-4 alkyl group, a substituted alkyl group, a C1-4 alkoxy group, a substituted alkoxy group, an amino group, a substituted amino group and a substituted phenyl group.

Further, the above-mentioned substituted alkyl group is preferably selected from C1-4 alkyl groups substituted by at least one group selected from the group consisting of OH, $SO_3H$, $PO_3H_2$, $CO_2H$ and $NH_2$. Furthermore, the above-mentioned substituted alkoxy group is preferably selected from C1-4 alkoxy groups substituted by at least one group selected from the group consisting of OH, $SO_3H$, $PO_3H_2$, $CO_2H$ and $NH_2$. In addition, the above-mentioned substituted amino group is preferably selected from the group consisting of amino groups having one or two C1-4 alkyl groups substituted by at least one group selected from the group consisting of OH, SO₃H, PO₃H₂, CO₂H and NH₂. Moreover, the above-mentioned substituted phenyl group is preferably selected from the group consisting of phenyl groups having one or two substituent groups selected from the group consisting of OH, SO₃H, PO₃H₂, CO₂H, NH₂, a C1-4 alkyl group and a substituted C1-4 alkyl group.

Further, as the compound represented by the above-mentioned formula (4), which is used in the invention, particularly preferred is a compound represented by the following formula (5):

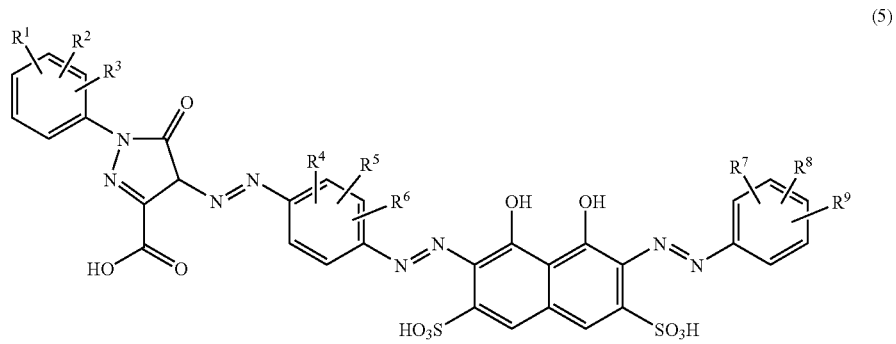

(5)

wherein R1 to R9 each independently represents a group selected from the group consisting of H, OH, SO₃H, PO₃H₂, CO₂H, NO₂ and NH₂.

A black aqueous ink composition which can be preferably used in the invention is a composition containing at least one black dye, and at least one selected from the group consisting of the compound represented by the above-mentioned formula (4) (hereinafter also simply referred to as compound (4)) and the salt thereof is contained as the black dye in the ink composition.

As compound (4), particularly preferred are compounds represented by the following formulas (6) to (12):

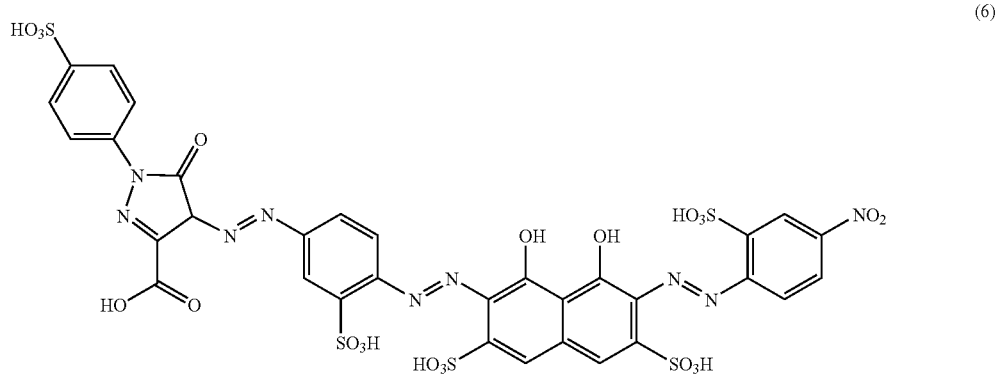

(6)

-continued
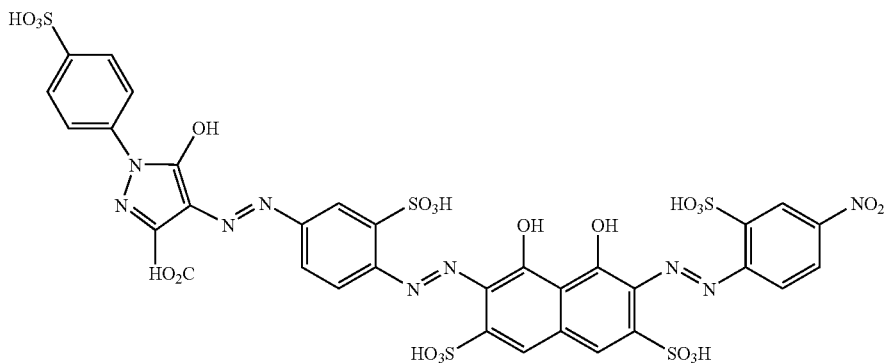
(7)
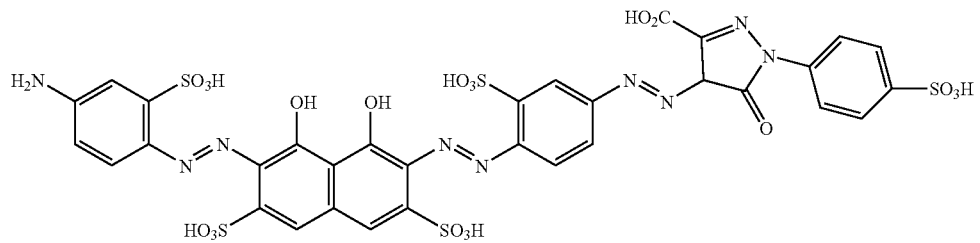
(8)
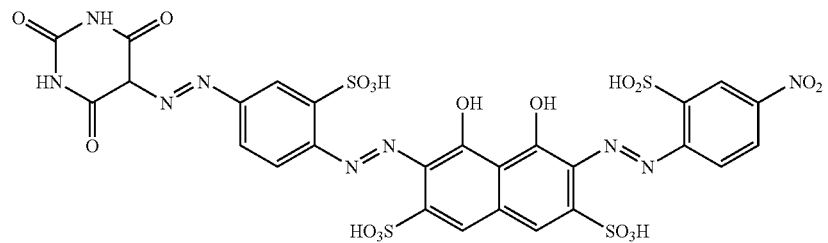
(9)
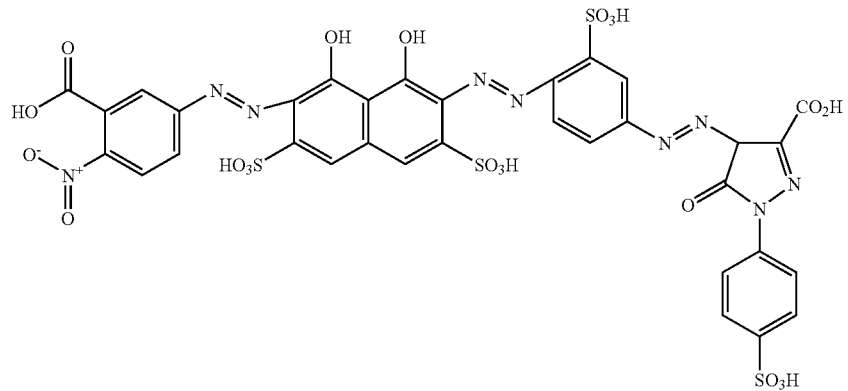
(10)
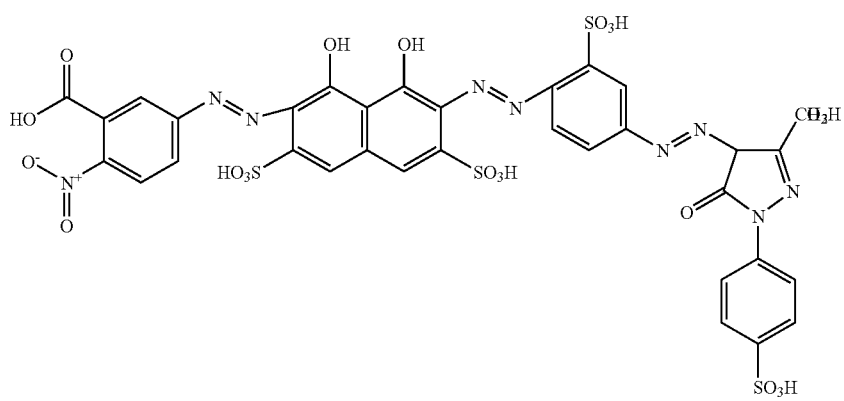
(11)

-continued

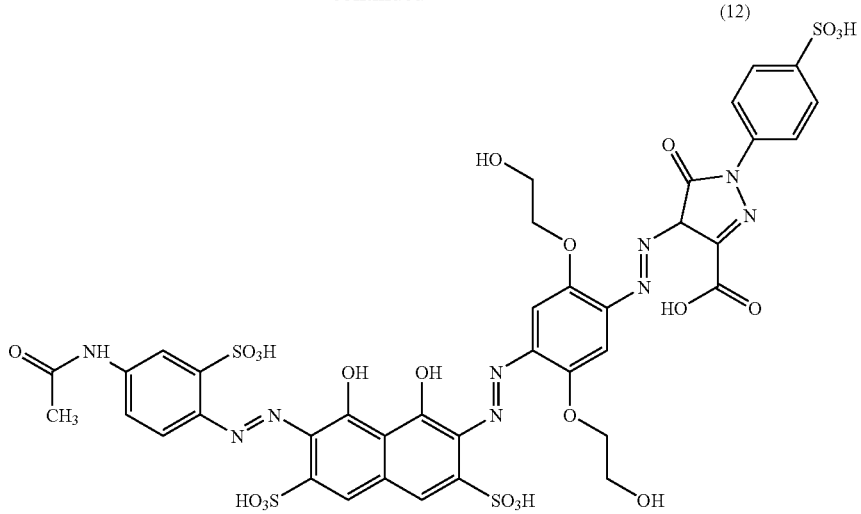

(12)

The compound represented by the above-mentioned formula (4) or (5) can be properly synthesized by preferred methods. For example, in each compound, building blocks having four corresponding structures bonded by three azo groups are bonded by azo coupling, thereby being able to synthesize the compound. That is to say, when a dihydroxynaphthalene skeleton portion represented by formula (4) is expressed by Q, the synthesized compound of formula (4) can be represented by $R^3$—N=N—$R^2$—N=N-Q-N=N—$R^1$. Schematically showing one specific method for synthesizing this compound, a diazonium salt obtained by diazotizing $R^1$—$NH_2$ is first reacted with QH to obtain $R^1$—N=N-QH. Next, a compound obtained by diazotizing $CH_3CON$—$R^2$—$NH_2$ is coupled to $R^1$—N=N-QH to synthesize $R^1$—N=N-Q-N=N—$R^2NCOCH_3$. The compound thus obtained is turned into an amino group by removing an acetyl group thereof, followed by diazotization and subsequently coupling to $R^3H$. Thus, $R^1$—N=N-Q-N=N—$R^2$—N=N—R3 can be synthesized.

Further, as a specific example of the synthesis, a synthesis example of the compound represented by the above-mentioned formula (6) is described below.

5-Acetylamino-2-aminobenzenesulfonic acid (23.0 g, 0.10 mol) was added to water (300 ml) containing concentrated nitric acid (30 ml). Sodium nitrite (6.9 g) was added at a temperature of 0 to 5° C. over 10 minutes. Sixty minutes later, excessive nitrous acid was decomposed, and the resulting diazonium salt solution was slowly added to a solution in which 1,8-dihydroxynaphthalene-3,6-disulfonic acid (32.0 g, 0.10 mol) had been dissolved in water (500 g), while maintaining 5 to 10° C. and pH-8 to 9. It could be confirmed by HPLC that this reaction quantitatively progressed. A coupling product-containing solution (referred to as a "dye base") was obtained thereby.

Then, 5-nitro-2-aminobenzenesulfonic acid (43.6 g, 0.20 mol) was added to water (500 g) containing concentrated hydrochloric acid (60 g). Sodium nitrite (13.8 g) was added at a temperature of 0 to 5° C. over 15 minutes. Sixty minutes later, the resulting diazonium salt solution was added to the above-mentioned dye base to which tetrahydrofuran (1000 g) had been previously added, over 120 minutes while maintaining 5 to 10° C. and pH 6 to 7. Five hours later, the resulting precipitate was collected and dried with a dryer to obtain dark-red solid matter (55.3 g). This dark-red solid matter was dissolved in water (1000 ml) and heated to 80° C. Sodium hydroxide (10 g) was added thereto, and the temperature was further maintained at 80° C. for 8 hours. Eight hours later, the pH of the solution was adjusted to 7 to 8 using concentrated hydrochloric acid, and the solution was allowed to stand to cool to room temperature. After dialyzed (less than 50 $\mu Scm^{-1}$) by Visking (trademark) tubing, this solution was passed through a filter, and dried with a dryer to obtain 47.2 g of black solid matter.

The black solid matter obtained above was redissolved in water at pH 7 to 9. Lithium hydroxide was used to adjust the pH. Then, sodium nitrite (8.3 g) was added thereto, followed by stirring for 10 minutes. Then, this dye/nitrite solution was transferred to ice water (100 ml) containing concentrated hydrochloric acid (30 g). The temperature increased to 15 to 25° C. on standing. However, the solution was left intact for three hours. The resulting diazonium salt solution was added to a solution of 1-(4-sulfophenyl)-3-carboxy-5-pyrazolone (17.9 g, 0.06 mol) over 120 minutes while maintaining 15 to 20° C. and pH 6 to 7. The pH of the solution was maintained by adding lithium hydroxide. Subsequently, this solution was dialyzed (less than 50 $\mu Scm^{-1}$) by Visking (trademark) tubing, further passed through a filter, and dried with a dryer to obtain 60.0 g of a compound represented by the above-mentioned formula (6) as black solid matter.

The salts of the compounds represented by the above-mentioned formula (4) as used in this specification include a slat of the compound represented by the above-mentioned formula (4) and a partial salt of the compound represented by the above-mentioned formula (4), and the above-mentioned salts and partial salts also include a complex salt. The partial salt of compound (4) means a salt comprising compound (4) and ions having an equivalent weight lower than that of protonic acids contained in compound (4). Further, the above-mentioned complex salt means the case where one molecule of compound (4) forms a salt with two or more kinds of ions. Examples of the above-mentioned salts of compound (4) include but are not limited to one or more selected from the group consisting of complex salts containing two or more selected from the group consisting of an alkali metal salt, an ammonium salt and an organic ammonium salt of compound (4), when compound (4) has protonic acid groups such as OH, $SO_3H$ and $PO_3H_2$, these various metals, ammonium and an organic ammonium. The above-mentioned alkali metal salts include, from example, a lithium salt, a sodium salt, a potassium salt, a cesium salt and a salt containing two or more metals thereof, and a lithium salt and a sodium salt are particularly preferred.

The above-mentioned compound (4) and salt thereof can be used alone or as a combination of two or more thereof. When two or more are used, there can be used either two or more compounds selected from each category of compound (4) or the salt of compound (4), or two or more compounds selected from the two kinds of categories.

As a colorant contained in an yellow ink composition, any one can be used. However, it is preferred to contain at least one selected from the group consisting of a compound represented by the following formula (13) and a compound represented by formula (14):

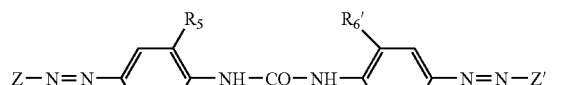

(13)

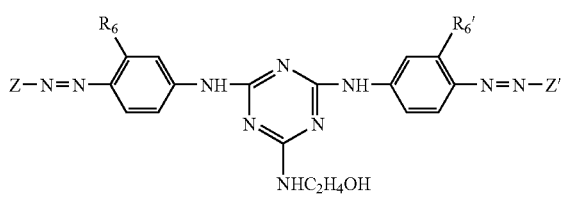

(14)

wherein $R_5$, $R_5'$, $R_6$ and $R_6'$ independently represent $CH_3$ or $OCH_3$, and Z and Z', which may be the same or different, independently represent

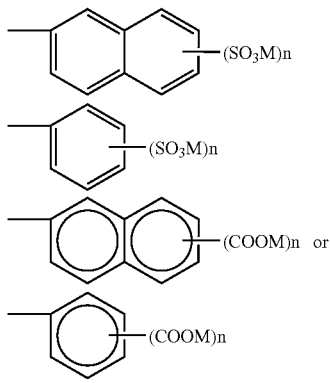

wherein M represents H, Li, Na, K, ammonium or an organic amine, and n is an integer of 1 or 2.

As the colorant contained in the yellow ink composition, there can be used a single kind of compound selected from the group consisting of the compound represented by the above-mentioned formula (13) and the compound represented by the above-mentioned formula (14). However, plural kinds of compounds selected therefrom may also be used.

The color density of the colorant in the ink composition can be appropriately selected according to the color value of a compound used as the colorant. The density is preferably selected at which color developing properties can be secured, and physical properties to be satisfied as an ink jet ink composition and reliability such as clogging properties are easily secured.

The ink composition which can be used in the invention can further contain a humectant selected from water-soluble organic solvents having a lower vapor pressure than pure water, and/or saccharides. By containing the humectant, the evaporation of water can be inhibited to achieve moisture retention of the ink in a ink jet recording system. Further, the water-soluble organic solvent can improve ejection stability, and easily change the viscosity without changing ink characteristics.

The water-soluble organic solvent indicates a medium having the capability of dissolving a solute, and is selected from organic, water-soluble solvents having a lower-vapor pressure than water. Specifically, desirable are polyhydric alcohols such as ethylene glycol, propylene glycol, butanediol, pentanediol, 2-butene-1,4-diol, 2-methyl-2,4-pentanediol, glycerin, 1,2,6-hexanetriol, diethylene glycol, triethylene glycol and dipropylene glycol, ketones such as acetonylaceton, esters such as γ-butyrolactone and triethyl phosphate, furfuryl alcohol, tetrahydrofurfuryl alcohol and thiodiglycol.

Further, as the saccharides, preferred are maltitol, sorbitol, gluconolactone and maltose.

The humectant is preferably used in an amount ranging from 5 to 50% by weight, more preferably in an amount ranging from 5 to 30% by weight, and still more preferably in an amount ranging from 5 to 20% by weight, based on the total amount of the ink composition. In an amount of 5% by weight or more, moisture retention is obtained, and in an amount of 50% by weight or less, the viscosity is easily adjusted to a level used in ink jet recording.

It is preferred that the ink composition which can be used in the invention contains a nitrogen-containing organic solvent as a solvent. The nitrogen-containing organic solvents include 1,3-dimethyl-2-imidazolidinone, 2-pyrrolidone N-methyl-2-pyrrolidone and ε-caprolactam. Above all, 2-pyrrolidone can be suitably used. Those can be used either alone or as a combination of two or more thereof.

The content thereof is preferably from 0.5 to 10% by weight, and more preferably from 1 to 5% by weight. The adjustment of the content to 0.5% by weight or more improves the solubility of the colorant in the invention caused by the addition of the nitrogen-containing organic solvent, and the adjustment thereof to 10% by weight or less does not deteriorate material resistance to various members with which the ink composition comes into contact.

Further, it is preferred that the ink composition which can be used in the invention contains a nonionic surfactant as an effective additive for obtaining rapid fixing (permeability) of the ink and maintaining the circularity of one dot.

The nonionic surfactants include, for example, an acetylene glycol-based surfactant. Specific examples of the acetylene glycol-based surfactants include Surfynol 465 and Surfynol 104 (both are manufactured by Air Products and Chemicals Inc., trade names), and Olfine STG and Olfine E1010 (both are manufactured by Nisshin Chemical Industry Co., Ltd., trade names). The amount thereof added is from 0.1 to 5% by weight, and preferably from 0.5 to 2% by weight. The adjustment of the amount added to 0.1% by weight or more can provide sufficient permeability, and the adjustment to 5% by weight or less makes it easy to prevent the occurrence of blurring of an image.

Further, in addition to the nonionic surfactant, a glycol ether can also be added as a penetration accelerator, thereby increasing permeability and decreasing bleeding of the ink at the boundaries with adjacent color inks at the time when color printing is conducted, which makes it possible to obtain a remarkably sharp image.

The glycol ethers include ethylene glycol monobutyl ether, diethylene glycol monobutyl ether, triethylene glycol monoethyl ether, propylene glycol monomethyl ether, dipropylene glycol monoethyl ether, propylene glycol monobutyl ether, dipropylene glycol mono butyl ether and triethylene glycol monobutyl ether. The amount thereof added is from 3 to 30% by weight, and preferably from 5 to 15% by weight. When the amount added is less than 3% by weight, the effect of bleed prevention is not obtained. Exceeding 30% by weight results in not only the occurrence of blurring in an image, but also the occurrence of oily separation, so that a dissolving assistant for these glycol ethers becomes necessary. This increases the viscosity of the ink to make difficult ejection of the ink at an ink jet head.

Further, the ink composition which can be used in the invention may contain a pH adjuster such as triethanolamine or an alkali metal hydroxide, a water-soluble-polymer such as sodium alginate, a water-soluble resin, a fluorine-based surfactant, a mildew proofing agent or a rust inhibitor, as needed.

As a method for preparing the ink composition, there is for example, a method of thoroughly mixing and dissolving the respective components, filtering the resulting solution through a membrane filter having a pore size of 0.8 µm under pressure, and then conducting deaeration treatment using a vacuum pump, thereby preparing the ink composition.

The recording method of the invention is described below. The recording method of the invention is an ink jet recording process in which an ink composition is ejected as droplets through minute nozzles, and the droplets are allowed to adhere to a recording medium, thereby performing recording. The printer of the invention is used as an ink jet printer.

As the ink jet recording processes, there can be used any known processes, and it is possible to perform excellent image recording by a process of ejecting droplets using an electrostrictive element (a recording process using an ink jet head which forms the ink droplets by mechanical deformation of the electrostrictive element) and a process of utilizing heat energy.

EXAMPLES

While the present invention will be illustrated in greater detail with reference to the following Examples and Comparative Examples, but the invention should not be construed as being limited thereto.

Example 1

Tubes

Using an elastomer obtained by blending PSIB with PP, ink tubes a and b (see FIGS. 2 and 3) were prepared. As shown in Table 9, tube a contained 3500 ppm of Irganox 1010 (registered trade mark) as an antioxidant, whereas tube b contained 50 ppm of Irganox 1010 and 700 ppm of Irganox 1076 (registered trade mark).

Each tube was brought into contact with an ink at room temperature for 5 days to conduct an elution test (a cyan (C) ink shown in Table 12 described below was used as the ink). Further, a member ink contact test was conducted at 60° C. for 5 days to visually observe generation of foreign matter. The results thereof are shown in Table 9.

TABLE 9

|  |  | Comparison Tube a | Invention Tube b PSIB + PP (elastomer) |
|---|---|---|---|
| Antioxidant (*) | Irganox 1010 | 3500 | 50 |
| Amount Added (ppm) | Irganox 1076 | — | 700 |
| Antioxidant | Irganox 1010 | 0.38 | Less than detection limit |
| Amount Eluted (ppm) | Irganox 1076 | — | 1.9 |
| Ink Contact Test | Generation of Foreign Matter | Generated | Not generated |

(*) Registered trade mark

Example 2

Films

Film a or b of PP shown in Table 10 was laminated on an inside of an aluminum-laminated film, and further processed into a bag form. This was filled with an ink and sealed, and allowed to stand at 60° C. for 5 days to bring the film into contact with the ink, thereby conducting an elution test of an antioxidant into the ink (a cyan (C) ink shown in Table 12 described below was used as the ink) Further, after standing under the above-mentioned conditions (at 60° C. for 5 days), generation of foreign matter in the ink was observed. The results thereof are shown in Table 10.

TABLE 10

|  |  | Comparison Film a | Invention Film b |
|---|---|---|---|
|  |  | PP | |
| Antioxidant (*) | Irganox 1010 | 1500 | 100 |
| Amount Added (ppm) | Irganox 1076 | — | — |
| Antioxidant | Irganox 1010 | 1.2 | 0.3 |
| Amount Eluted (ppm) | Irganox 1076 | — | — |
| Ink Contact Test | Generation of Foreign Matter | Generated | Not generated |

(*) Registered trade mark

The amount of the antioxidants added in Tables 9 and 10 was measured by (1) extracting a sample with n-hexane by the Soxhlet method, (2) evaporating an extract to dryness by using a rotary evaporator, (3) adding acetone to an evaporated residue to redissolve it, and filtering a supernatant through a membrane filter to prepare a sample for measurement, and (4) performing qualitative and quantitative determinations of the antioxidant by HPLC. Measurement conditions were as follows:

Apparatus: 2690/2487 (manufactured by Nihon Waters K.K.)

Column; Xterra MS C9 2.5µ, 4.6×50 mm (manufactured by Nihon Waters K.K.)

Mobile phase: water/acetonitrile=40/60→0/100, 20 minutes, linear gradient

Flow rate: 1.0 ml/min

Injection rate: 5 µl

Detection: 280 nm

Further, the amount of the antioxidants eluted in Tables 9 and 10 was measured by (1) immersing a certain amount of the member in the ink under specified conditions, (2) then, fractionating a certain amount of the ink, and adding acetone thereto to make the volume constant, (3) applying an ultrasonic wave to a supernatant, and then, filtering it through a membrane filter to prepare a sample for measurement, and (4) performing qualitative and quantitative determinations of the antioxidant by HPLC under the same conditions as described above.

Furthermore, the foreign matter in FIG. 10 was observed by (1) disposing an electrocasted metal filter having a pore size of 10 μm on a mesh filter of a filter bottle, (2) adding dropwise a certain amount of the ink to the electrocasted metal filter under reduced-pressure, and performing filtration, (3) observing and confirming foreign matter having a form seemed to be a crystalline molecular complex, under a metallurgical microscope, and (4) identifying it with an infrared absorptiometer (FT-IR) as needed.

Example 3

Durability Test on Actual Machine

Tube a or b described in Table 9 was used as an ink tube for supplying an ink from each ink cartridge to a print head mounted on a carriage, and a bag in which film a or b described in Table 10 was laminated on a face which comes into contact with the ink was used as an ink storage bag of the ink cartridge. Using such a printer, an ink durability test was conducted (the respective ink compositions are shown in Table 12 described below).

The ink durability test was conducted by a method of repeatedly printing an evaluation pattern in room temperature environment, and changing the ink cartridge when the ink end was reached. For the number of the ink cartridges used, the number of the cartridges corresponding to the compensating life of the printer was used, and it was confirmed whether a printed image defect was found or not. When the defect was found, the printer was disassembled for investigation, and it was confirmed whether clogging due to foreign matter occurred or not.

In sample 2 using a passage-constituting member in which the content of Irganox 1010 was suppressed, no defect caused by foreign matter clogging occurred, and printing was sufficiently made. In contrast, in sample 1 using a conventional passage-constituting member, it was confirmed that a cyan ink was impossible to be ejected because of foreign matter clogging at a feed throat (a narrowed portion of a passage) of the print head. For magenta, light magenta and light cyan inks, generation of foreign matter was also observed, although no printed image defect was found.

The results thereof are shown in Table 11.

TABLE 11

| | Sample No. | | | | | | | | | | | |
|---|---|---|---|---|---|---|---|---|---|---|---|---|
| | 1 | | | | | | 2 | | | | | |
| Ink Tube | Tube a | | | | | | Tube b | | | | | |
| Ink Cartridge | Film a | | | | | | Film b | | | | | |
| Kind of Ink (*) | Bk | Y | M | C | LM | LC | Bk | Y | M | C | LM | LC |
| Printed image defect | No | No | No | Observed | No | No | No | No | No | No | No | No |
| Foreign Matter Clogging (**) | A | A | B | C | B | B | A | A | A | A | A | A |

(*) Bk: Black
Y: Yellow
M: Magenta
C: Cyan
LM: Light magenta
LC: Light cyan
(**) A: No generation of foreign matter and no foreign matter clogging
B: Foreign matter was generated.
C: Foreign matter clogging occurred.

TABLE 12

| | Bk | Y | M | C | LM | LC |
|---|---|---|---|---|---|---|
| Black Dye | 4.50 | | | | | |
| Yellow Dye 1 | 0.75 | | | | | |
| Yellow Dye 2 | | 3.60 | | | | |
| Magenta Dye 1 | | | 3.50 | | 1.70 | |
| Magenta Dye 2 | 0.60 | | | | | |
| Cyan Dye | | | | 4.50 | | 1.40 |
| Glycerol | 10.00 | 10.00 | 10.00 | 10.00 | 10.00 | 10.00 |
| Triethylene Glycol | 1.50 | 8.00 | 2.00 | 3.00 | 9.00 | 9.00 |
| Triethylene Glycol Monobutyl Ether | 8.00 | 9.00 | 9.00 | 9.00 | 9.00 | 9.00 |
| 1,2-Hexanediol | 2.00 | | 1.00 | 1.00 | | 2.00 |
| 2-Pyrrolidone | 3.50 | | 1.00 | | 3.00 | 3.00 |
| Urea | | | 2.00 | 4.00 | 0.00 | 2.00 |
| Surfactant A | 1.00 | | 0.50 | 0.50 | 0.80 | 0.80 |
| Surfactant B | | | 0.50 | 0.50 | 0.20 | 0.20 |
| Surfactant C | | 0.50 | | | | |

TABLE 12-continued

|  | Bk | Y | M | C | LM | LC |
|---|---|---|---|---|---|---|
| Triethanolamine | 0.50 |  | 0.50 | 0.50 | 0.50 | 0.20 |
| Water | 67.65 | 68.90 | 70.00 | 67.00 | 65.80 | 62.40 |
| Total | 100.00 | 100.00 | 100.00 | 100.00 | 100.00 | 100.00 |

Numerical values in the table indicate percents by weight.

The compound represented by formula (6) was used as the black dye in Table 11, C.I. Direct Yellow 173 was used as the yellow dye 1, C.I. Direct Yellow 86 was used as the yellow dye 2, dye 8 of Table 5 was used as the magenta dye 1, dye 15 of Table 6 was used as the magenta dye 2, and compound F of Table 2 was used as the cyan dye Compositions of the surfactants are as shown in the following Table 13.

TABLE 13

|  | Surfactant | | |
|---|---|---|---|
|  | A | B | C |
| Surfactant | 100 | 40 | 50 |
| Solubilizing Agent |  | 43 |  |
| Propylene Glycol |  | 13 | 50 |
| Water |  | 4 |  |
| Trade Name | Olfine E1010 | Olfine PD-001 | Surfynol 104 PG50 |
|  | Ethylene oxide (10 mol) addition product of acetylenediol | Acetylenediol/ nonionic surfactant | Acetylenediol/ nonionic surfactant |

Numerical values in the table indicate percents by weight.

While the present invention has been described in detail and with reference to specific embodiments thereof, it will be apparent to one skilled in the art that various changes and modifications can be made therein without departing from the spirit and scope thereof.

The present application is based on Japanese Application No. 2004-194476 filed June 30, the contents thereof being herein incorporated by reference.

What is claimed is:

1. An ink jet printer having an ink-contacting member, wherein the ink-contacting member is selected from the group consisting of an ink tank, a member for attaching an ink tank, a needle member for attaching an ink cartridge, a tube, an ink fluid path joint and a print head, wherein the ink contacting member is in contact with an ink until the ink is ejected from a print head and contains an antioxidant and a concentration of a compound represented by the following formula (1) of 100 ppm or less:

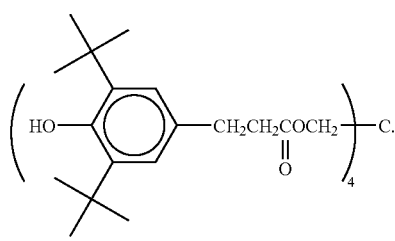

(1)

2. The inkjet printer according to claim 1, wherein the antioxidant comprises a compound represented by the following formula (2) and/or formula (3):

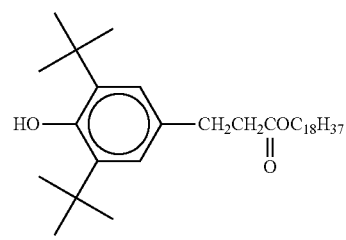

(2)

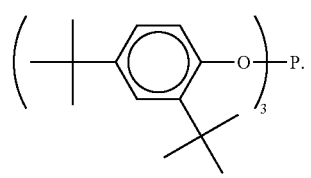

(3)

3. An ink jet recording method comprising providing the ink jet printer according to claim 2, and causing the ink jet printer to eject droplets of an ink composition to attach the droplets onto a recording medium, thereby performing printing.

4. An inkjet recording method comprising providing the ink jet printer according to claim 1, and causing the ink jet printer to eject droplets of an ink composition to attach the droplets onto a recording medium, thereby performing printing.

5. A composition of matter comprising a recording medium having printing thereon that has been recorded by the ink jet recording method according to claim 4.

6. The ink jet printer according to claim 1, wherein the ink-contacting member comprises a base material, the antioxidant and the compound represented by formula (1).

7. The ink jet printer according to claim 6, wherein the antioxidant is elutable from the ink-contacting member upon contact with the ink for a period of time.

8. The ink jet printer according to claim 6, wherein the compound represented by formula (1) is elutable from the ink-contacting member upon contact with the ink for a period of time.

9. The ink jet printer according to claim 6, wherein the base material is selected from the group consisting of polyethylene, polypropylene, an elastomer of polystyrene isobutyl and polypropylene, a modified polyphenylene ether and a polyacetal.

10. The ink jet printer according to claim 9, wherein the antioxidant and the compound of formula (1) are present in the contact member in respective amounts effective to inhibit formation of a crystalline molecular complex that forms when the base material comes in contact with an ink.

11. The ink jet printer according to claim 1, wherein the antioxidant is elutable from the ink-contacting member upon contact with the ink for a period of time.

12. The ink jet printer according to claim 1, wherein the compound represented by formula (1) is elutable from the ink-contacting member upon contact with the ink for a period of time.

13. The ink jet printer according to claim 1, wherein the ink-contacting member comprises a base material selected from the group consisting of polyethylene, polypropylene, an elastomer of polystyrene isobutyl and polypropylene, a modified polyphenylene ether and a polyacetal.

14. The ink jet printer according to claim 1, wherein the antioxidant and the compound of formula (1) are present in the contact member in respective amounts effective to inhibit formation of a crystalline molecular complex that forms when the base material comes in contact with an ink.

* * * * *